(12) United States Patent
Ortlieb et al.

(10) Patent No.: US 7,600,329 B2
(45) Date of Patent: Oct. 13, 2009

(54) DRIER

(75) Inventors: Konrad Ortlieb, Stuttgart (DE); Helmut Zurich, Ochtrup (DE); Jürgen Weschke, Weil der Stadt (DE); Peter Näpfel, Tamm (DE); Manfred Föttinger, Fernwald (DE); Rudolf Strauss, Bietigheim-Bissingen (DE)

(73) Assignee: Durr Systems GmbH, Stuttgart (DE)

( * ) Notice: Subject to any disclaimer, the term of this patent is extended or adjusted under 35 U.S.C. 154(b) by 16 days.

(21) Appl. No.: 11/752,218

(22) Filed: May 22, 2007

(65) Prior Publication Data

US 2007/0261264 A1    Nov. 15, 2007

Related U.S. Application Data

(63) Continuation of application No. PCT/EP2005/012000, filed on Nov. 9, 2005.

(30) Foreign Application Priority Data

Nov. 23, 2004   (DE)   ................ 10 2004 056 404

(51) Int. Cl.
*F26B 25/06* (2006.01)
*F26B 25/00* (2006.01)
*B65G 13/00* (2006.01)
*B65G 13/02* (2006.01)

(52) U.S. Cl. .................................... 34/666; 34/270

(58) Field of Classification Search .............. 34/201, 34/666, 270; 198/782, 813; 414/433
See application file for complete search history.

(56) References Cited

U.S. PATENT DOCUMENTS

| 1,927,634 A | 9/1933 | Fahrenwald |
| 1,992,467 A | 2/1935 | Blythe |
| 2,077,189 A | 4/1937 | Rishel |
| 2,105,973 A | 1/1938 | Hereford |
| 2,797,006 A * | 6/1957 | Thompson ................ 414/433 |
| 2,818,156 A | 12/1957 | Edwards |
| 2,890,802 A | 6/1959 | Alimanestiano |
| 3,204,785 A | 9/1965 | Bajulaz |
| 3,402,481 A | 9/1968 | LaPan |

(Continued)

FOREIGN PATENT DOCUMENTS

CH        254872 A       5/1948

(Continued)

*Primary Examiner*—Jiping Lu
(74) *Attorney, Agent, or Firm*—Leydig, Voit & Mayer, Ltd.

(57) ABSTRACT

In order to provide an easy-to-assemble drier (100) for drying surface-treated workpieces, in particular vehicle bodies (110), which are each disposed on a respective workpiece carrier (109), comprising a drier housing (102) having a drier tunnel (108), through which the workpieces are moved along a conveying direction (112) and which is delimited in a downward direction by a drier floor (116) comprising a plurality of floor elements (118), and a conveying device (138) that conveys the workpieces through the drier tunnel (108), it is proposed that the conveying device (138) comprises a plurality of carrying roller units (140), which are disposed successively in the conveying direction (112) and each comprise at least one carrying roller (142), on which the workpiece carriers (109) rest as they are conveyed through the drier tunnel (108), wherein the carrying roller units (140) are each mountable separately on a respective floor element (118) of the drier floor (116).

43 Claims, 15 Drawing Sheets

U.S. PATENT DOCUMENTS

| | | | |
|---|---|---|---|
| 3,433,236 A * | 3/1969 | Koch et al. ................. 198/813 |
| 3,968,559 A | 7/1976 | Karlsson |
| 4,248,341 A | 2/1981 | Schuck et al. |
| 4,343,395 A | 8/1982 | Lippert et al. |
| 4,564,100 A | 1/1986 | Moon |
| 4,620,373 A | 11/1986 | Laskowski |
| 4,774,773 A | 10/1988 | Zwyssig |
| 4,894,909 A | 1/1990 | Sakamoto et al. |
| 4,901,845 A | 2/1990 | Zorgiebel |
| 4,951,802 A | 8/1990 | Weissgerber et al. |
| 5,037,263 A | 8/1991 | Yamashita |
| 5,116,182 A | 5/1992 | Lin |
| 5,217,374 A | 6/1993 | Birks |
| 5,242,045 A | 9/1993 | Kakida et al. |
| 5,263,267 A * | 11/1993 | Buttner et al. ................. 34/519 |
| 5,494,561 A | 2/1996 | Darche et al. |
| 5,553,988 A | 9/1996 | Horn et al. |
| 5,556,466 A | 9/1996 | Martin et al. |
| 5,661,912 A | 9/1997 | Bhatnagar et al. |
| 5,873,165 A | 2/1999 | Bode et al. |
| 6,197,175 B1 | 3/2001 | Kisi et al. |
| 6,269,941 B1 | 8/2001 | Ueno |
| 6,455,817 B1 | 9/2002 | Guzzi et al. |
| 6,557,268 B1 | 5/2003 | Berg et al. |
| 6,990,749 B2 * | 1/2006 | Roesler et al. ................. 34/666 |
| 2001/0030108 A1 | 10/2001 | Hansen |
| 2003/0042113 A1 | 3/2003 | Kasagi |
| 2004/0032061 A1 | 2/2004 | Sachse et al. |
| 2005/0194234 A1 | 9/2005 | Schmohl et al. |
| 2007/0261953 A1 | 11/2007 | Kohler et al. |

FOREIGN PATENT DOCUMENTS

| | | |
|---|---|---|
| DE | 47 113 | 5/1889 |
| DE | 1 754 378 U | 10/1957 |
| DE | 1 060 420 | 7/1959 |
| DE | 2031105 A | 1/1971 |
| DE | 2130610 A1 | 12/1972 |
| DE | 23 24 393 C3 | 11/1973 |
| DE | 2245991 A1 | 7/1974 |
| DE | 2451056 A1 | 5/1976 |
| DE | 2031105 B2 | 5/1979 |
| DE | 2031105 C3 | 1/1980 |
| DE | 28 38 974 C2 | 3/1980 |
| DE | 8321727 U1 | 12/1983 |
| DE | 3439860 A1 | 3/1986 |
| DE | 3439860 C2 | 10/1987 |
| DE | 40 07 707 A1 | 9/1990 |
| DE | 40 41 211 C1 | 1/1992 |
| DE | 42 33 970 C2 | 9/1993 |
| DE | 42 22 349 A1 | 1/1994 |
| DE | 44 30 882 A1 | 3/1996 |
| DE | 198 39 725 C1 | 3/2000 |
| DE | 199 36 879 C1 | 9/2000 |
| DE | 199 42 556 A1 | 3/2001 |
| DE | 199 50 202 C2 | 5/2001 |
| DE | 201 04 205 U1 | 7/2001 |
| DE | 101 62 084 A1 | 6/2002 |
| DE | 203 04 601 U1 | 6/2003 |
| DE | 202 11 083 U1 | 8/2003 |
| DE | 10238493 A1 | 3/2004 |
| DE | 103 25 656 B3 | 7/2004 |
| DE | 102004008812 A1 | 9/2005 |
| DE | 102004011254 A1 | 9/2005 |
| DE | 102004061791 A1 | 7/2006 |
| DE | 202004021146 U1 | 12/2006 |
| DE | 102006030334 A1 | 1/2008 |
| EP | 0 149 694 A1 | 7/1985 |
| EP | 0 255 620 A2 | 2/1988 |
| EP | 0 436 081 A1 | 7/1991 |
| EP | 0581687 A1 | 2/1994 |
| EP | 0 649 919 B1 | 4/1995 |
| EP | 1055895 A1 | 11/2000 |
| EP | 1 424 268 A2 | 6/2004 |
| EP | 1 510 477 A1 | 5/2005 |
| FR | 1 076 870 | 5/1953 |
| FR | 2756815 A | 6/1998 |
| FR | 2 785 884 A1 | 5/2000 |
| GB | 120809 A | 11/1918 |
| GB | 462838 A | 3/1937 |
| GB | 844309 | 8/1960 |
| GB | 1 203 789 A | 9/1970 |
| GB | 1310971 A | 3/1973 |
| JP | 54-163483 | 12/1979 |
| JP | 03-159886 | 7/1991 |
| JP | 03-186510 | 8/1991 |
| JP | 8-246194 A | 9/1996 |
| WO | WO 99/04209 A1 | 1/1999 |
| WO | WO 02/047894 A1 | 6/2002 |
| WO | WO 2004/018333 A1 | 3/2004 |
| WO | WO 2004/081476 A1 | 9/2004 |
| WO | WO 2004/081476 B1 | 1/2005 |
| WO | WO 2006/066920 A1 | 6/2006 |
| WO | WO 2008/000345 A1 | 1/2008 |

* cited by examiner

DRIER

RELATED APPLICATION

This application is a continuation application of PCT/EP2005/012000 filed Nov. 9, 2005, the entire specification of which is incorporated herein by reference.

FIELD OF DISCLOSURE

The present invention relates to a drier for drying surface-treated workpieces, in particular vehicles bodies, which are each disposed on a respective workpiece carrier, wherein the drier comprises a drier housing having a drier tunnel, through which the workpieces are moved along a conveying device and which is delimited in a downward direction by a drier floor comprising a plurality of floor elements, and a conveying device that conveys the workpieces through the drier tunnel.

BACKGROUND

Such driers are known from the prior art.

In the known driers, the conveying device, that conveys the workpieces through the drier tunnel, is designed for example as a carrying-chain conveyor, in which a vehicle body disposed on a skid frame is placed by means of a rapid-removal belt onto a chain comprising carrying links and/or is carried away by a rapid acceleration of the chain and conveyed on the chain through the drier. For driving and tensioning the chain, there is situated at the start and end of the conveying device a driving and tensioning station comprising driving and tensioning elements disposed outside of the drier housing.

During assembly of the known driers, first the drier housing is assembled with the drier tunnel, and then the components of the conveying equipment, such as floor-anchoring devices, conveyor modules, driving and tensioning stations, are introduced into the drier tunnel, welded to the floor panels and fitted together. Finally—in the case of a carrying-chain conveyor—the carrying chain is pulled in. In this case, the accessibility of the drier tunnel from two sides only and the confined spatial conditions in the drier tunnel make it difficult to assemble the conveying device in situ.

SUMMARY OF THE INVENTION

The underlying object of the present invention is to provide a drier of the initially described type, which is easy to assemble.

In a drier having the features of the preamble of claim 1, this object is achieved according to the invention in that the conveying device comprises a plurality of carrying roller units, which are disposed successively in the conveying direction and each comprise at least one carrying roller, on which the workpiece carriers rest as they are conveyed through the drier tunnel, wherein the carrying roller units are each mountable separately on a respective floor element of the drier floor.

The underlying concept of the solution according to the invention is therefore to simultaneously utilize the floor elements, which are used to form the drier floor, additionally for the accommodation of conveying equipment components and hence to integrate the carrying roller units of the conveying device into the drier floor.

This offers the advantage that, after mounting of the carrying roller units on the respective floor element, the floor element with the carrying roller unit may be handled as a preassembled unit, which may be brought as a whole to the installation site of the drier and combined there with the remaining component parts of the drier.

There is therefore no need for the carrying roller units to be introduced, after completion of the drier, through the entry or exit of the drier tunnel into the drier tunnel and then mounted in the drier.

As a result of the use of mechanically and electrically preassembled units for the conveying equipment and the drier floor, assembly at the construction site of the drier is substantially simplified and speeded up.

It is moreover particularly easy to match the conveying equipment and the drier housing to one another. Conveying equipment and drier housing may be planned by the same design office and manufactured jointly in the same factory, thereby reducing the number of interfaces needed for planning and manufacture.

Owing to the use of the carrying roller units, which may be individually assembled and/or dismantled independently of one another, the conveying equipment according to the invention is of a modular design. Each of these modules is made up of few components such as for example roller block, shafts and gear unit. As these few components may be used for a plurality of different drier designs, they may be stocked in a large piece number. When processing a concrete order, the requisite material may be taken from such stock, thereby markedly reducing the manufacturing time.

The conveying device according to the invention having the carrying rollers integrated into the drier floor moreover offers the advantage that it projects up above the floor of the drier tunnel only a little or not at all, so that the height of the drier housing may be reduced by the height of an otherwise necessary conveying device mounted onto the drier floor (up to 50 cm).

In the solution according to the invention, the carrying roller units integrated into the drier floor form a roller conveyor, which however is not assembled as a unit outside of the drier and independently of the drier and then introduced into the drier tunnel but, as a result of mounting each of the individual carrying roller units on a respective floor element of the drier floor, may be already integrated into the drier floor before formation of the drier tunnel.

The workpiece carriers may in particular take the form of skid frames.

By a "skid frame" in the present context is meant a workpiece carrier comprising at least two skid runners, which are oriented along the conveying direction of the workpieces and mutually spaced apart transversely of the conveying direction of the workpieces, wherein each skid runner has a support surface for supporting the skid frame on the conveying device, in particular on a roller conveyor.

Here, the skid runners of the skid frame may be fitted directly onto the workpiece so that the workpiece itself effects the connection of the skid runners to one another.

In a special development of the invention, it is provided that the carrying roller units each comprise only one carrying roller.

Alternatively, it may be provided that the carrying roller units each comprise exactly two carrying rollers, which are disposed substantially coaxially with one another.

In a preferred development of the invention, it is provided that the floor elements are load-bearing elements of the drier floor.

These floor elements may in particular take the form of profile elements.

For the mechanical stability of the drier floor and the conveying device it is particularly advantageous if the floor elements have a U-shaped or a hat-shaped cross section.

To the floor elements there may be fastened in particular feet, by which the drier is supported on a foundation of the drier.

In order to keep the necessary height of the drier housing as low as possible, it may be provided that the floor elements each have a receiver, in which a carrying roller unit associated with the respective floor element is at least partially accommodated so that the carrying roller unit projects as little as possible up above the drier floor.

In a preferred development of the invention, it is provided that the floor elements extend transversely of, preferably substantially at right angles to, the conveying direction.

The mechanical stability of the drier floor and the conveying device is further increased when a plurality of floor elements, on each of which at least one carrying roller unit is mounted, are connected to one another by means of at least one stiffening element.

These stiffening elements may also take the form of profile elements having a U-shaped or a hat-shaped cross section.

For maintenance and repair purposes it is particularly advantageous if the carrying roller units are mounted detachably on the respectively associated floor element.

To prevent dirt from the conveying equipment components from passing into the drier tunnel, it is advantageously provided that the floor elements are provided with a cover that has in each case at least one through-opening for a carrying roller of a carrying roller unit.

This cover is preferably removable from the respectively associated floor element in order to make the region of the floor element situated under the cover accessible for maintenance and repair purposes.

It has further proved advantageous if the carrying roller units each comprise at least one carrying roller shaft, which is mounted on a roller block so as to be detachable for maintenance purposes.

In particular, it may be provided that the carrying roller shafts comprise in each case a shaft profile and a sleeve, which is detachably fastened, in particular screw-fastened, to the shaft profile.

For ease of exchange of the carrying roller shafts, it is advantageous if the carrying roller shafts after detachment of the at least one sleeve are removable from the respectively associated roller block.

In a preferred development of the invention, it is provided that the conveying device comprises a drive device for setting at least one carrying roller of a carrying roller unit in rotation. In this case, the conveying of the workpieces disposed on the workpiece carriers through the drier tunnel may be effected by means of the carrying rollers of the conveying device, and no further drive, in particular no chain drive, is needed for this translational movement.

Eliminating the chain conveyor eliminates the material abraded from the chain that otherwise has to be removed at specific intervals from the drier in a cleaning procedure. The need to lubricate the chain is also eliminated, with the added result that no excess lubricating grease may be swirled up by the air flow in the drier and introduced for example into the paint coating of painted workpieces. The maintenance outlay of the conveying device is particularly low as a result of dispensing with a chain. A further result of dispensing with a chain is that no chain breakage can occur.

The drive device for setting at least one carrying roller unit in rotation preferably comprises a drive motor, which may for example take the form of a gear motor.

In a preferred development of the invention, it is provided that the drive motor is disposed outside of the drier housing.

In principle, a separate drive motor may be provided for each driven carrying roller, this allowing each driven carrying roller to be driven at an individual rotational speed and in an individual direction of rotation.

As an alternative to this, it may be provided that a plurality of driven carrying rollers are driven by means of the same drive motor.

In order that driven carrying rollers situated in conveying direction upstream and downstream of the drive motor may be driven, it is advantageous if the drive motor has a plurality of driven shafts.

It is further preferably provided that the drive device comprises at least one connection shaft for transmitting a rotational movement from one element of the drive device to another.

At least one of the connection shafts may be oriented transversely of, preferably substantially at right angles to, the conveying direction. Such connection shafts are suitable for transmitting a rotational movement in the longitudinal direction of the floor elements, in particular from a gear unit disposed on the wall of the drier housing to a carrying roller unit.

It may further be provided that at least one of the connection shafts is aligned substantially parallel to the conveying direction. Such connection shafts are suitable in particular for transmitting the rotational movement from the drive motor to carrying roller units situated in conveying direction upstream or downstream of the drive motor.

Preferably, at least one of the connection shafts, in particular one of the connection shafts oriented substantially parallel to the conveying direction, is disposed outside of the drier housing.

In order to transmit the rotational movement from a driven carrying roller to a further carrying roller, it may be provided that at least one of the connection shafts is disposed between two carrying rollers.

In order to compensate a misalignment or a not precisely coaxial alignment of two elements of the drive device that are connected to one another by means of a connection shaft, it is advantageous if at least one of the connection shafts is connected by at least one flexible coupling to a carrying roller or to a drive motor or to a gear unit.

In a preferred development of the invention, it is provided that the drive device comprises at least one gear unit.

Such a gear unit may be disposed in particular on a wall element of the drier housing.

To prevent an escape of hot air from the drier interior, it is advantageous if the wall element is connected, preferably welded, in a substantially gastight manner to one of the floor elements of the drier floor.

The wall element may further be provided with heat insulation.

The gear unit of the drive device may in particular take the form of an angular gear unit in order to be able to deflect the direction of transmission of the rotary drive.

In order to prevent hot air from being able to escape from the drier interior in an outward direction along a shaft of the drive device, the drive device preferably has at least one shaft seal for effecting the substantially gastight sealing of a shaft that extends through a wall element of the drier housing.

As an alternative to the generation of the translational movement of the workpieces through the drier tunnel by means of a drive device for the carrying roller units, it may also be provided that the conveying device comprises at least one traction means, to which the workpiece carriers may be coupled.

In this case, it is possible to dispense with a drive of the carrying rollers in the drier floor; the carrying rollers integrated in the drier floor then merely have the function of carrying and laterally guiding the workpiece carriers with the workpieces disposed thereon, not however of driving the translational movement of the workpiece carriers.

The traction means used advantageously comprises at least one driver, which in a coupled position acts upon in each case one workpiece carrier.

In order to be able to dispose the traction means return run in the immediate vicinity of the workpiece carrier path, it is advantageous if the driver is movable from the coupled position into an inoperative position, in which it does not act upon the workpiece carriers.

The traction means used may in particular take the form of a chain or a rope.

Particularly space-saving is a conveying device, in which the traction means forward run and/or the traction means return run—seen from above in plan view—extends between the lateral edges of the workpiece carriers, in particular between the runners of skid frames.

When the carrying rollers of the conveying device are disposed in two carrying roller rows extending substantially parallel to the conveying direction, for a space-saving arrangement of the conveying device it is advantageous if the traction means forward run and/or the traction means return run—seen from above in plan view—extends between the two carrying roller rows.

It is particularly advantageous if the conveying device of the drier is designed such that the conveying speed of the workpieces along the conveying direction is variable. This means that the distances between the workpieces moving successively along the conveying direction may be varied in any desired manner and for example gaps may be deliberately produced between successive workpieces.

A variable conveying speed of the workpieces may easily be generated for example by operating the drive devices of carrying roller units disposed successively in conveying direction at different rotational speeds.

The drier may comprise a plurality of sections disposed successively in conveying direction, wherein the conveying speed of the workpieces along the conveying direction varies from section to section.

In particular, the drier may be composed of drier modules disposed successively in the conveying direction, wherein the conveying speed of the workpieces varies from module to module.

As an alternative to this, it is however also possible to provide in one and the same drier module a plurality of drive devices with different conveying speeds.

To prevent the workpiece carriers in the drier from colliding with one another because of the slip between the carrying rollers and the workpiece carriers, it is advantageous if the conveying speed of the workpieces in the drier tunnel increases on average along the conveying direction.

In order to be able to introduce the workpieces as rapidly as possible into the drier, in particular within a conveying cycle defined by a conveying device disposed upstream of the drier, it is advantageous if the drier is provided in its entry region with a rapid-removal roller conveyor, which is operated at a much higher conveying speed than the conveying device that conveys the workpieces from the entry region to the exit region of the drier.

In a corresponding manner, it is advantageous if the exit region of the drier is provided with a rapid-removal roller conveyor so that the dried workpieces from the drier may be discharged very quickly from the drier, for example within a conveying cycle defined by a conveying device disposed downstream of the drier.

A further underlying object of the present invention is to provide a rapid and easy-to-implement method of assembling a drier for drying surface-treated workpieces, in particular vehicle bodies, which are each disposed on a respective workpiece carrier.

This object is achieved by a method that comprises the following method steps:

mounting a plurality of carrying roller units, which are disposed successively in a conveying direction and each comprise at least one carrying roller, on which the workpiece carriers rest as they are conveyed through a drier tunnel of the drier, on a respective floor element of a drier floor of the drier;

subsequently manufacturing the drier using the preassembled units formed by the floor elements and the carrying roller units disposed thereon.

Further features and advantages of the invention are the subject matter of the following description and the graphic representation of embodiments.

DETAILED DESCRIPTION OF THE INVENTION

Figure 1:
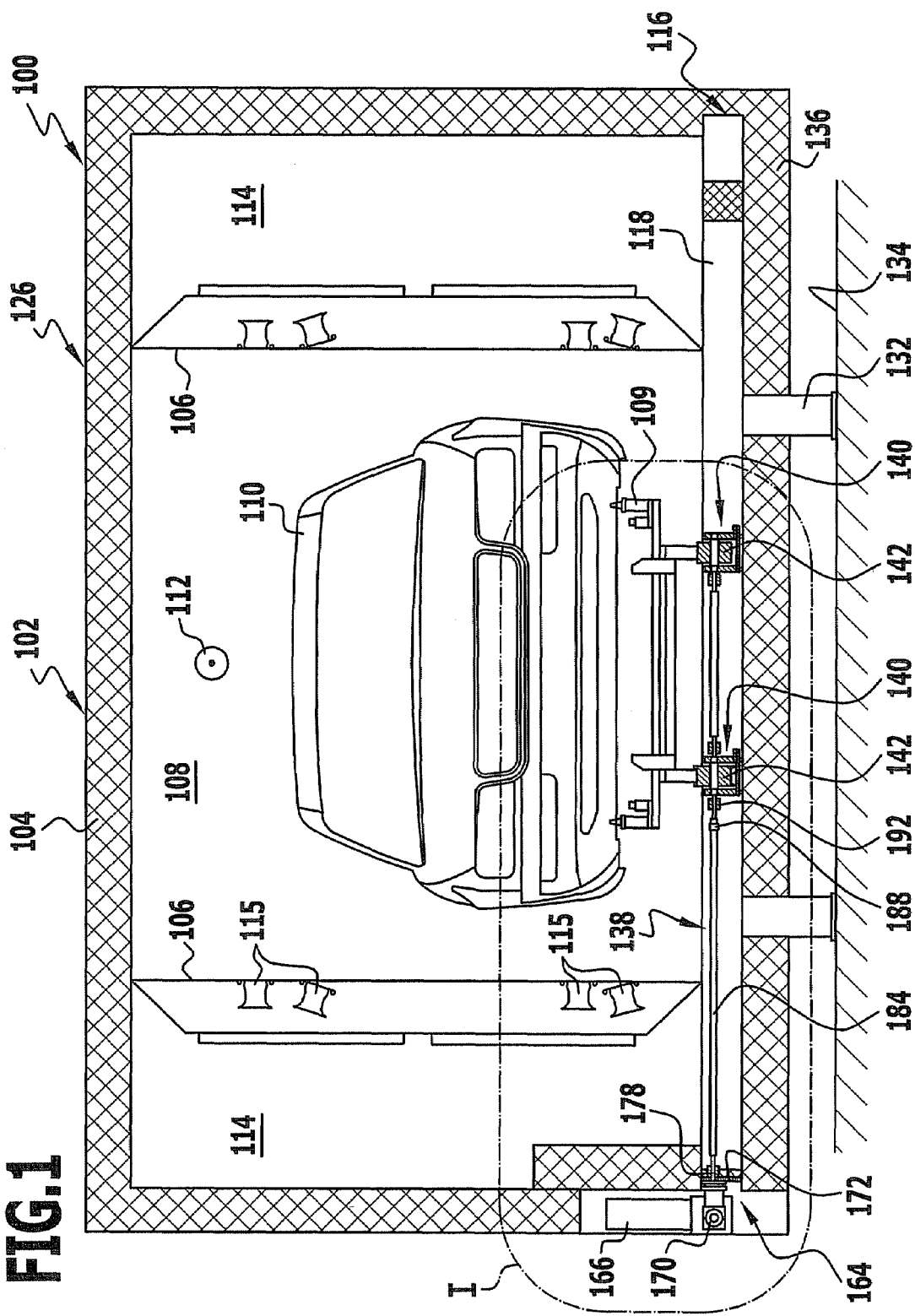
FIG. 1 a diagrammatic cross section through a drier having a drier tunnel, through which vehicle bodies disposed on skid frames are moved by means of driven carrying rollers, which are fastened to hat-shaped profiles of the drier floor.

A drier represented in FIGS. 1 to 6 and denoted as a whole by 100 comprises a substantially cuboidal drier housing 102, which is provided with heat insulation 104.

The interior of the drier housing 102 is subdivided by means of vertical partitions 106 into a drier tunnel 108, through which vehicle bodies 110 disposed on in each case one skid frame 109 serving as a workpiece carrier are conveyed along a conveying direction 112 extending parallel to the longitudinal direction of the drier 100, and into two hot-air supply chambers 114 disposed on either side of the drier tunnel 108. The partitions 106 are provided with hot-air supply nozzles 115, through which hot air from the hot-air supply chambers 114 passes into the drier tunnel 108 to the vehicle bodies 110.

The drier floor denoted as a whole by 116 comprises, as load-bearing elements, floor elements 118, which take the form of hat-shaped profiles that extend horizontally and substantially at right angles to the conveying direction 112.

Figure 5:
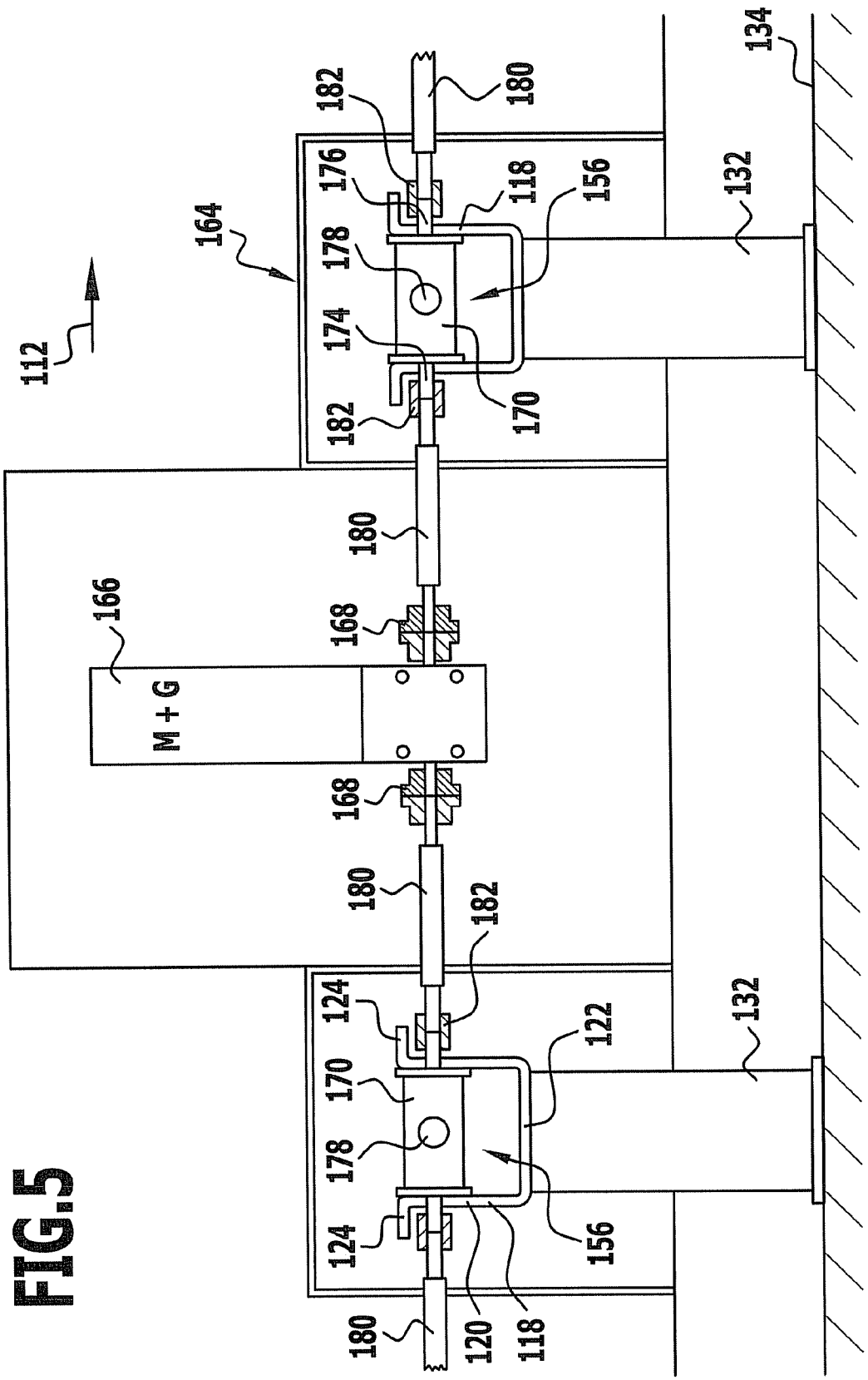
FIG. 5 an enlarged view of the region III of FIG. 4.

As may best be seen from FIG. 5, each of the floor elements 118 comprises an, in cross section, U-shaped middle part having two vertical limbs 120 and a horizontal web 122, which connects the bottom edges of the vertical limbs 120 to one another, as well as two horizontal flanges 124, which extend in opposite directions to one another from the top edges of the vertical limbs 120.

These, in cross section, hat-shaped floor elements 118 are disposed successively along the conveying direction 112 at a distance d of for example approximately 1 m.

Figure 6:
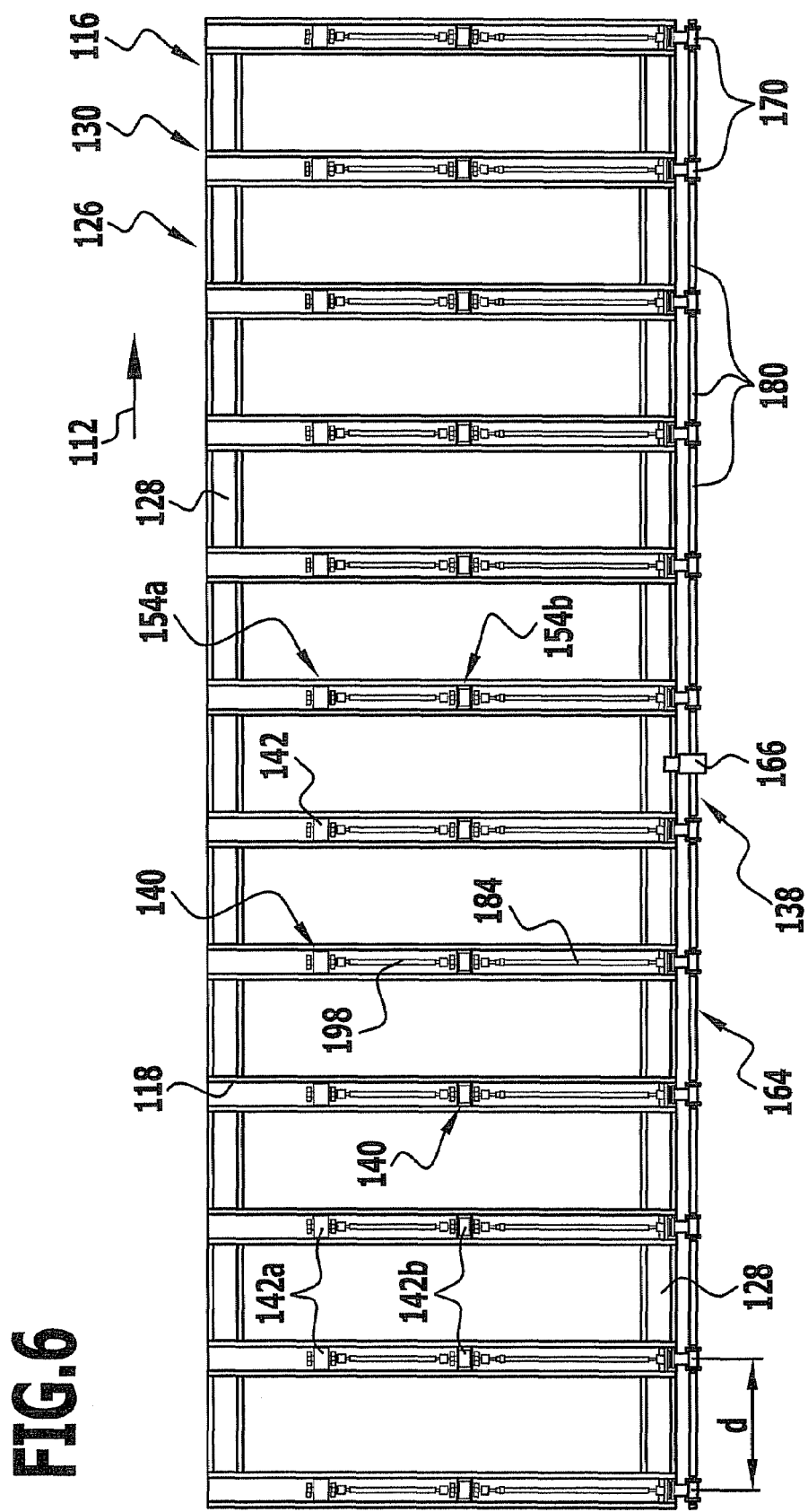
FIG. 6 a diagrammatic plan view of a conveying device comprising 12 pairs of driven carrying rollers that is integrated into the drier floor of a drier module.

The drier 100 is of a modular construction and comprises a plurality of drier modules 126 disposed successively along the conveying direction 112 and having a predetermined modular length of for example approximately 12 m and hence a predetermined number of for example 12 floor elements, wherein the distance between the start and/or the end of a drier module 126, on the one hand, and the in each case most closely adjacent floor element 118 is for example approximately 0.5 m (see FIG. 6).

Figure 4:
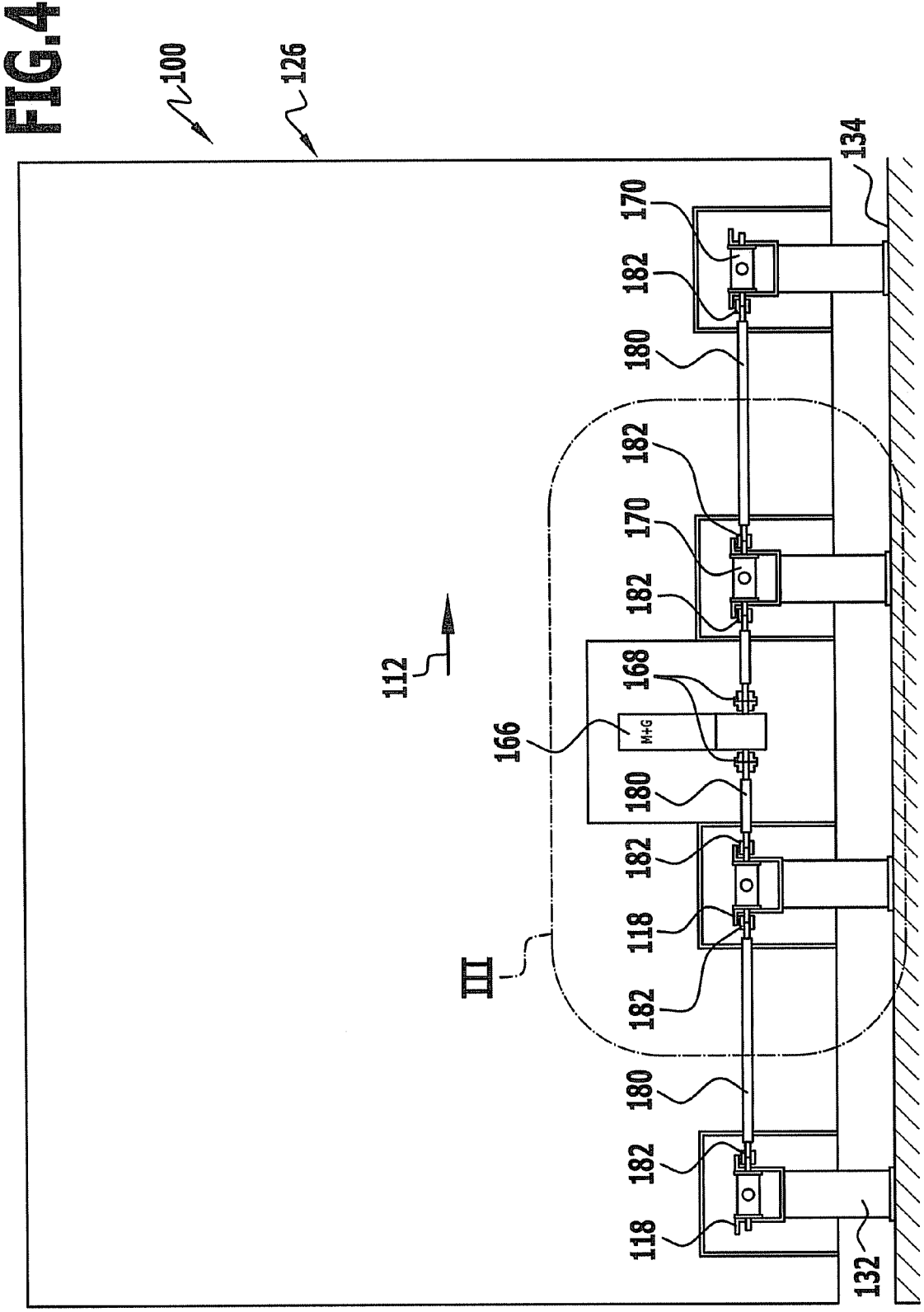
FIG. 4 a diagrammatic, part-sectional side view of a section of a drier module with four pairs of carrying rollers.

The drier module represented in FIG. 4 has six floor elements 118. Each of the drier modules 126 is manufactured as a unit in the factory, transported as a unit to the installation site of the drier 100 and joined together there with further drier modules 126 until the desired total length of the drier 100 is achieved.

To stiffen the drier floor 116, the floor elements 118 of a drier module 126 are connected to the respective adjacent floor elements 118 by in each case two stiffening elements 128, which extend substantially parallel to the conveying direction 112 in each case between the left ends and between the right ends of the floor elements 118.

These stiffening elements 128 may likewise take the form of hat-shaped profiles.

The floor elements 118 and the stiffening elements 128 therefore together form a load-bearing floor frame 130 of the drier floor 116.

Welded onto the underside of the webs 122 of the floor elements 118 there is in each case a plurality of feet 132, by which the floor frame 130 is supported on a foundation 134 (see FIG. 4).

As may be seen for example from FIG. 1, there is further fitted to the underside of the floor elements 118 and the stiffening elements 128 heat insulation 136, which extends also through the gaps that are left in the drier floor 116 between the floor elements 118 and the stiffening elements 128.

For conveying the vehicle bodies 110 disposed on the skid frames 109 through the drier tunnel 108, each drier module 126 further comprises a conveying device 138, which in turn comprises a plurality of carrying roller units 140 that are disposed successively along the conveying direction 112 and integrated into the floor frame 130.

Each of the carrying roller units 140 comprises in each case one substantially cylindrical carrying roller 142, which is disposed in a rotationally fixed manner on a carrying roller shaft 144, and one roller block 146, on the two limbs 148 of which the carrying roller shaft 144 is mounted by means of ball bearings 150 rotatably about a horizontal axis of rotation 152 extending at right angles to the conveying direction 112.

The two limbs 148 of each roller block 146 extend upwards from a common horizontal base plate 153.

In each case two of these carrying roller units 140 are fastened in a mutually independently detachable manner to each of the floor elements 118, namely in such a way that the carrying rollers 142 of the two carrying roller units 140 are aligned coaxially with one another and mutually spaced apart at right angles to the conveying direction 112.

As may be seen from FIG. 6, the carrying rollers 142*a* fastened in each case (viewed in conveying direction 112) on the left to the floor elements 118 are disposed in a mutually aligned manner along the conveying direction 112, so that these lefthand carrying rollers 142*a* form a lefthand carrying roller row 154*a*.

In a corresponding manner, the carrying rollers 142*b* disposed in each case (viewed in conveying direction 112) on the right on the floor elements 118 are likewise disposed in a mutually aligned manner in conveying direction 112, so that these righthand carrying rollers 142*b* together form a righthand carrying roller row 154*b*.

The carrying roller units 140 are fastened preferably detachably to the floor elements 118, for example by screw-fastening their roller blocks 146 to the webs 122 of the floor elements 118.

The screw-fastening of the roller blocks 146 to the floor elements 118 is effected in a way that allows a dismantling and an aligning of the carrying rollers 142 with little effort.

Figure 2:
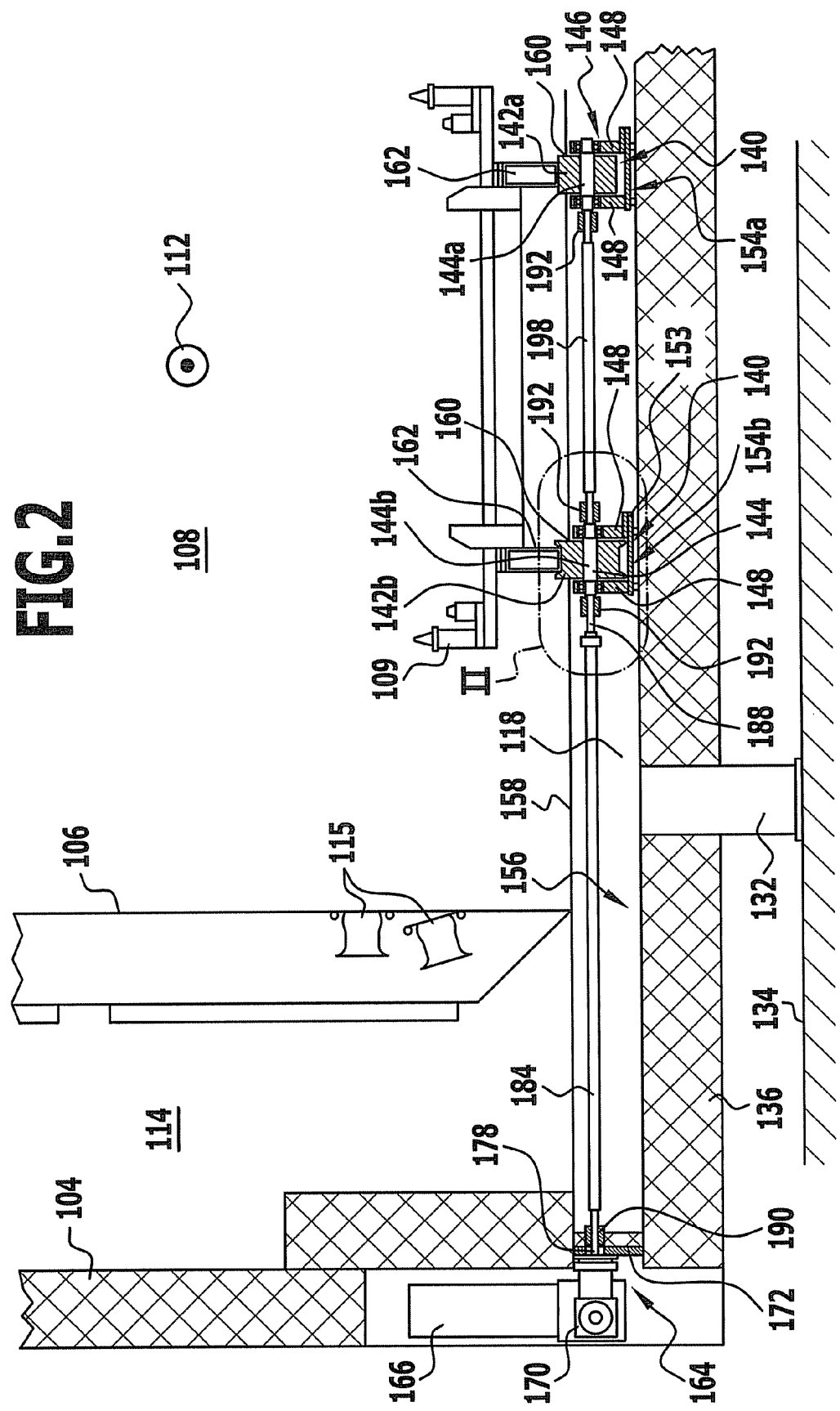
FIG. 2 an enlarged view of the region I of FIG. 1.

As may best be seen from FIG. 2, the inner space 156 of each floor element 118 that is delimited by the vertical limbs 120 and the web 122 of the relevant floor element 118 forms in each case a receiver for the two carrying roller units 140 disposed on the floor element 118, in which receiver the roller blocks 146 of these carrying roller units 140 are completely accommodated.

This inner space 156 of each floor element 118 is covered in an upward direction, i.e. in the direction of the drier tunnel 108 and/or the hot-air supply chambers 114, in each case by a cover plate 158.

These cover plates 158 are detachably fastened, in particular screw-fastened, in each case to the horizontal flanges 124 of the respective floor element 118.

Preferably, each of these cover plates 158 extends over substantially the entire length of the respective floor element 118 in order, by removing the cover plate 158, to make the entire inner space 156 of the floor element 118 accessible for maintenance or cleaning purposes.

Each of the cover plates 158 has in the region of the carrying roller units 140 in each case one substantially rectangular through-opening 160 for in each case one carrying roller 142, through which through-opening the respective associated carrying roller 142 extends so that the crest of the carrying roller 142, on which the skid frames 109 to be conveyed rest by in each case one of their runners 162, is disposed above the cover plate 158.

So that the skid frames 109 with the vehicle bodies 110 disposed thereon may be moved through the drier tunnel 108, in the form of construction of the drier 100 represented in FIGS. 1 to 6 all of the carrying rollers 142 of a drier module 126 may be set in rotation about their axes of rotation 152 by means of a drive device denoted as a whole by 164.

As may best be seen from FIGS. 4 to 6, the drive device 164 of the drier module 126 comprises a drive motor 166, which is disposed on the outside of the drier housing 102, i.e. outside of the heat insulation 104, roughly centrally on a longitudinal side of the drier module 126.

The drive motor 166 takes the form of a gear motor and has two driven shafts 168 oriented in mutually opposite directions parallel to the conveying direction 112.

With each floor element 118 there is associated in each case a gear unit 170, which is screwed onto a vertical end plate 172, which is welded at one of the ends (for example at the, viewed in conveying direction 112, right end) of the floor element 118 in a gastight manner into the floor element 118 so that it seals off the inner space 156 of the floor element 118 in a gastight manner from the outside of the drier 100 and hence prevents hot air from escaping out of the drier 100.

On the inside of the end plate 172 facing the inside of the drier 100, heat insulation is disposed.

The gear units 170 take the form of angular gears, in particular bevel gears, and comprise in each case a drive-end input shaft 174, a first output shaft 176 aligned parallel to the input shaft 174, and a second output shaft 178 extending in horizontal direction and at right angles to the input shaft 174 into the interior of the drier 100.

The input shaft 174 of each gear unit 170 is connected by in each case one longitudinal connection shaft 180, which extends substantially horizontally and parallel to the conveying direction 112, either to one of the driven shafts 168 of the drive motor 166 or to the first output shaft 176 of another gear unit 170 positioned closer to the drive motor 166.

The longitudinal connection shafts 180 are in this case connected at their one end by means of in each case one coupling 182 in a rotationally fixed manner to one of the driven shafts 168 of the drive motor 166 or to an output shaft 176 of a gear unit 170 and at their other end likewise by means of a coupling 182 to the input shaft 174 of a gear unit 170.

The couplings 182 may be of a flexible, in particular pliable design in order to allow compensation of any misalignment and/or deviation in the alignment of the shafts that are to be connected to one another by the longitudinal connection shaft 180.

The longitudinal connection shafts 180 may in particular comprise pipes, to the ends of which shaft profiles are fastened, in particular welded.

The first output shaft 176 of each gear unit 170 is connected by in each case one longitudinal connection shaft 180 to the input shaft 174 of a gear unit 170 situated further away from the drive motor 166. Only the gear units 170, which are disposed right at the start and/or right at the end of a drier module 126 and are not succeeded by a further gear unit 170, are not connected at their first output shafts 176 to a further longitudinal connection shaft 180.

The second output shaft 178 of each gear unit 170 that extends at right angles to the conveying direction 112 into the inner space 156 of in each case one floor element 118 is sealed off in a substantially gastight manner from the exterior of the drier 100 by means of a shaft seal (not shown) situated inside the housing of the gear unit 170, thereby preventing hot air from the interior of the drier 100 from escaping outwards along this output shaft 178.

Each of these second output shafts 178 is connected by in each case one transverse connection shaft 184, which extends substantially at right angles to the conveying direction 112 through the inner space 156 of a floor element 118, to the carrying roller shaft 144 of the in each case closer-lying carrying roller 142b.

Figure 3:
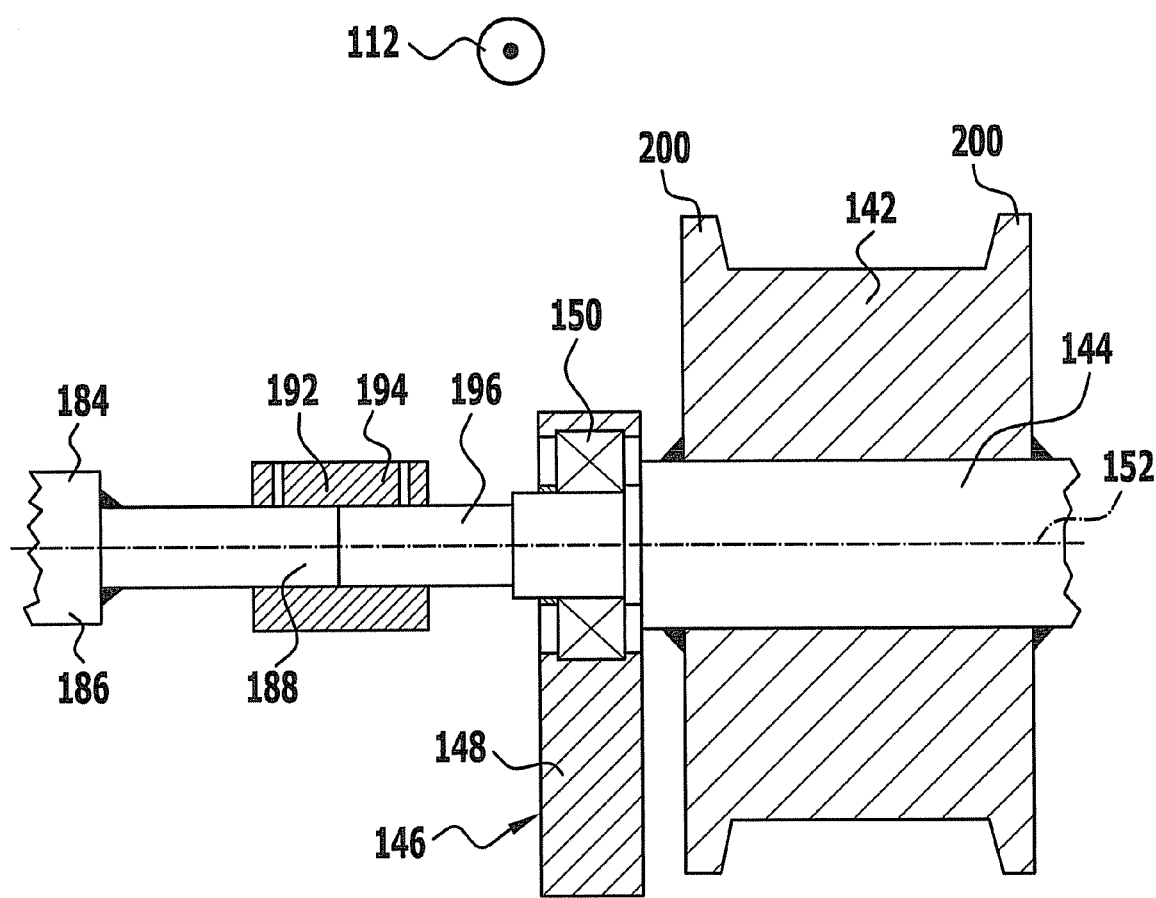
FIG. 3 an enlarged view of the region II of FIG. 2.

The transverse connection shafts 184 likewise comprise in each case a pipe 186, to each end of which a shaft profile 188 is fastened, in particular welded (see in particular FIG. 3).

Each transverse connection shaft 184 is connected at its one end by a coupling 190 to the second output shaft 178 of a gear unit 170 and at the opposite end by a coupling 192 to the carrying roller shaft 144 of the carrying roller 142b.

The two couplings 190 and 192 may be of a flexible, in particular pliable design to allow them, in the event of the transverse connection shaft 184 not being aligned exactly with the second output shaft 178 of the gear unit 170 and/or with the carrying roller shaft 144 of the carrying roller 142b, to adapt to the position and alignment of these shafts.

As may be seen from FIG. 3, the coupling 192 may in particular comprise a hollow-cylindrical sleeve 194, which receives the carrying-roller-side shaft profile 188 of the transverse connection shaft 184 and a connection-shaft-side shaft profile 196 formed on the end of the carrying roller shaft 144.

So that the carrying roller 142a situated further away from the gear unit 170 and disposed on the same floor element 118 may be set in rotation, the carrying roller shaft 144b of the carrying roller 142b disposed closer to the gear unit 170 is connected by a further transverse connection shaft 198 to the carrying roller shaft 144a of the carrying roller 142a situated further away from the gear unit 170.

The transverse connection shaft 198 extends substantially at right angles to the conveying direction 112 through the inner space 156 of the floor element 118 and is connected in a rotationally fixed manner by couplings 192 at its two ends to the carrying roller shafts 144a and 144b.

In order to be able to compensate a misalignment and/or a deviation in the alignment of the carrying roller shafts 144a, 144b, the couplings 192 are preferably of a flexible, in particular pliable, design.

The couplings 192 may in particular, like the coupling 192 between the transverse connection shaft 184 and the carrying roller shafts 144b, comprise a hollow-cylindrical sleeve 194 that accommodates the shaft profiles of the shafts that are to be connected to one another.

The couplings 192 are detachably fastened, in particular screw-fastened to the shaft profiles 196 of the carrying roller shafts 144, thereby allowing their removal from the carrying roller shafts 144. After detachment of the couplings 192 from the carrying roller shafts 144, the carrying roller shafts 144 may be displaced along their axis of rotation 152 relative to the respective associated roller block 146 and then removed upwards in the direction of the drier tunnel 108 from the roller block 146 after the cover plate 158 has previously been removed from the floor element 118 to make the inner space 156 of the floor element 118 accessible from the drier tunnel 108.

In this way, it is possible to dismantle the carrying roller shafts 144 in order to be able to exchange, for example, a roller block 146, a ball bearing 150 of a roller block 146, or a carrying roller 142.

In a variant of the previously described form of construction, it may alternatively be provided that the two carrying rollers 142a, 142b disposed on the same floor element 118 are not connected by a transverse connection shaft 198 disposed between them but are instead disposed on a common carrying roller shaft 144, which extends through the inner space 156 of the floor element 118 from the one carrying roller 142*a* to the other carrying roller 142*b*.

With the previously described drive device 164, it is possible by means of the frequency-controlled drive motor 166 to allow all of the carrying rollers 142 to rotate at the same rotational speed about their axes of rotation 152, so that the skid frames 109 resting on the carrying rollers 142 and the vehicle bodies 110 disposed on the skid frames 109 are moved along the conveying direction 112 because of the friction between the runners 162 of the skid frames 109 and the peripheral surfaces of the carrying rollers 142.

For lateral guidance of the skid frames 109 during this movement, the carrying rollers 142*b* disposed in each case on the right and/or the carrying rollers 142*a* disposed in each case on the left may be provided with one or more wheel flanges 200 (see FIG. 3).

Should there be slip between the skid frames 109 and the carrying rollers 142, this slip may then be compensated by means of different rotational speeds of the drive motor 166.

To prevent skid frames 109 from colliding with one another owing to different slip, it may be provided that the rotational speed of the drive motors 166 of drier modules 126 disposed successively in conveying direction 112 gradually increases in conveying direction 112, with the result that the conveying speed of the skid frames 109 gradually increases in conveying direction 112, so that the vehicle bodies 110, as they travel through the drier tunnel 108, are pulled apart from one another and therefore prevented from bumping into one another.

Instead of a single drive device 164, one or more or all of the drier modules 126 of the drier 100 may be provided with a plurality of drive devices 164 each comprising a drive motor 166, so that the conveying speed of the skid frames 109 may be varied also within the same drier module 126 by operating the drive motors 166 of the drive devices 164, disposed successively in conveying direction 112, of the relevant drier module 126 at different rotational speeds.

Conversely, it is also conceivable for a plurality of drier modules 126 disposed successively in conveying direction 112 to have a common drive device 164 comprising only one drive motor 166, so that this drive motor 166 then drives the carrying rollers 142 of a plurality of drier modules 126.

The carrying roller units 140 disposed in the entry region and/or in the exit region of the drier 100 may form in each case a rapid-removal roller conveyor, which is operated at a particularly high conveying speed of for example approximately 30 m/min in order to convey the vehicle bodies 110 very quickly, in particular within a defined cycle time, into the drier 100 and/or out of the drier 100 and transfer them to a downstream conveying device.

In particular, it is therefore possible, in the case of a drier 100 disposed at a different height level to a conveying device disposed upstream of the drier 100, within a conveying cycle to raise or lower in each case one vehicle body 110 to the level of the drier 100 by means of a lifting device, move the vehicle body 110 into the drier tunnel 108 by means of the rapid-removal roller conveyor and then lower or raise the empty lifting device in order to receive the next vehicle body 110.

In a corresponding manner, in the case of a drier 100 disposed at a different height level to a conveying device disposed downstream of the drier, it is possible within a conveying cycle of the downstream conveying device by means of the rapid-removal roller conveyor in the end region of the drier 100 to move in each case one vehicle body 110 out of the drier tunnel 108 onto the lifting device, lower or raise the vehicle body 110 by means of the lifting device, transfer the vehicle body 110 at the different height level to the downstream conveying device and then raise or lower the empty lifting device in order to receive the next vehicle body 110.

Between the rapid-removal roller conveyors in the entry region and in the exit region of the drier 100 the vehicle bodies 110 are conveyed at the normal conveying speed of for example approximately 3 m/min.

The rapid-removal roller conveyors in the entry region and in the exit region of the drier 100 are of an identical construction to the previously described conveying device 138.

A drier module 126 for the entry region or for the exit region of the drier 100 may in particular be equipped with two drive devices 164 each comprising a drive motor 166, wherein the one drive device 164 drives the carrying rollers 142 of the respective rapid-removal roller conveyor at the rotational speed for a higher driving speed, while the other drive device 164 drives the carrying rollers 142 adjoining the rapid-removal roller conveyor at the rotational speed for the normal conveying speed.

The conveying speed in the drier 100 may easily be varied by disposing a plurality of mutually independently operating drive devices 164 successively in conveying direction 112 in the drier 100. It is also possible for the vehicle bodies 110 to be brought to a complete halt or moved temporarily counter to conveying direction 112.

When the drier 100 comprises for example a recirculating-air drier section and a UV-radiation drier section, which are disposed successively in conveying direction 112, then the vehicle bodies 110 may be conveyed for example through the recirculating-air drier section at the normal conveying speed of for example approximately 3 m/min, then brought to a halt for a required dwell time in the UV-radiation drier section for irradiation with UV light, and then conveyed further at an increased conveying speed in order to reach on average the normal conveying speed once more.

It is also possible by suitable control of the drive devices 164 to produce between two vehicle bodies 110 succeeding one another in conveying direction 112 a gap that allows a UV irradiation device to be introduced between the two vehicle bodies 110 so that the rear of the front vehicle body 110 and the front of the rear vehicle body 110 may be irradiated.

For manufacture of the previously described drier 100, first the floor frame 130 of the drier floor 116 of a drier module 126 is manufactured. Then, the carrying roller units 140 are fastened individually to the floor elements 118 of the floor frame 130, and the drive device 164, which comprises in each case a drive module 166 as well as gear units 170, longitudinal connection shafts 180 and transverse connection shafts 184, 198, is mounted on the floor frame 130.

After completion of this assembly step, the floor frame 130 and the conveying device 138 comprising the carrying roller units 140 and the drive device 164 form a mechanically and electrically preassembled unit that may be handled as a whole.

This preassembled unit may be brought as a whole to the site where the drier 100 is to be installed and, there, may be combined with the remaining component parts of the drier 100.

As an alternative to this, it is also possible to manufacture the complete drier module 126 including the preassembled unit of floor frame 130 and conveying device 138 at the factory and then transport the complete drier module 126 to the installation site of the drier 100 and combine it there with further drier modules 126 to form the finished drier 100.

Figure 7:
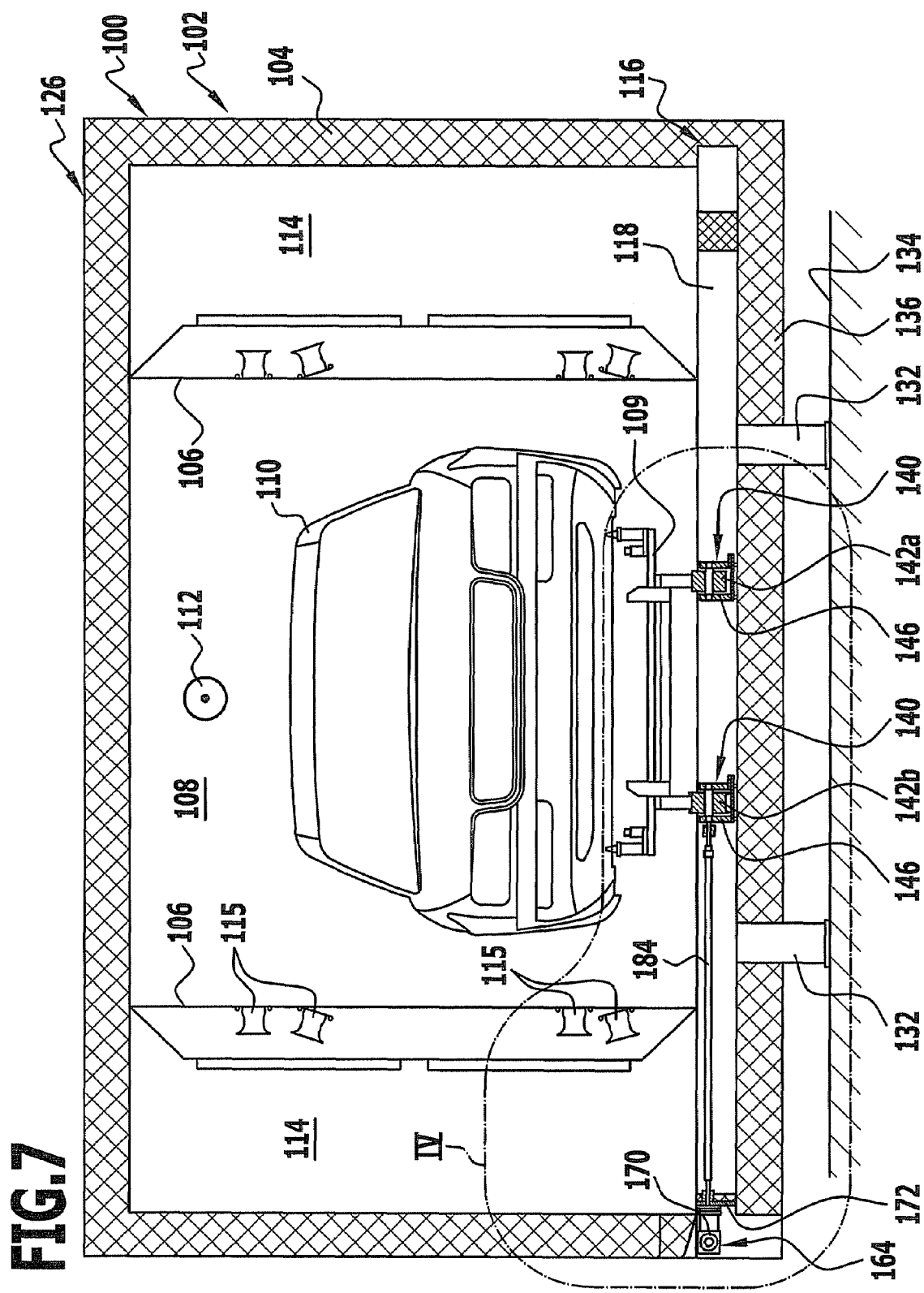
FIG. 7 a diagrammatic cross section through a second form of construction of a drier having a drier tunnel, through which vehicle bodies disposed on skid frames are conveyed, and having a conveying device comprising pairs of carrying rollers, of which in each case only one carrying roller is driven.
Figure 8:
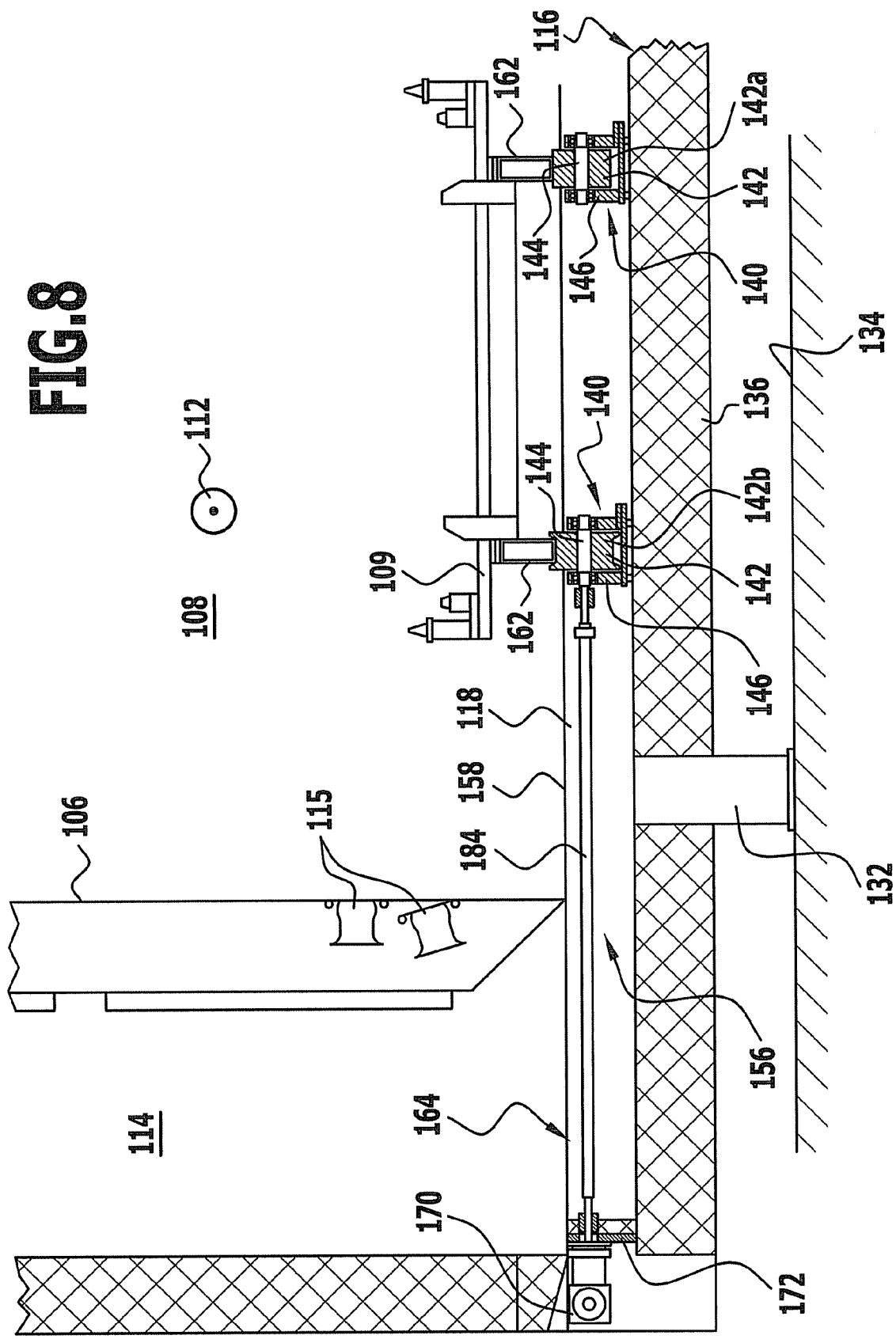
FIG. 8 an enlarged view of the region IV of FIG. 7.

A second form of construction of a drier 100 that is represented in FIGS. 7 and 8 differs from the previously described first form of construction in that, of each pair of carrying rollers 142 associated with a floor element 118, in each case only one carrying roller 142, namely the carrying roller 142b disposed closer to the gear unit 170, is set in rotation about its axis of rotation 152 by means of the drive device 164.

The carrying roller 142a situated further away from the gear unit 170, on the other hand, is not driven but simultaneously rotates merely because of the friction between the runners 162 of the skid frames 109 and the peripheral surface of the carrying roller 142a when the skid frame 109 is moved in conveying direction 112 by means of the driven carrying roller 142b.

In this form of construction, the non-driven carrying rollers 142a are therefore used merely to support the skid frames 109 having the vehicle bodies 110 disposed thereon, not however to drive the skid frames 109.

The transverse connection shaft 190 provided between the two carrying rollers 142a and 142b in the first form of construction therefore no longer applies.

Otherwise, the second form of construction represented in FIGS. 7 and 8 corresponds in construction, function and assembly method to the first form of construction represented in FIGS. 1 to 6, to the above description of which reference is made in this respect.

Figure 9:
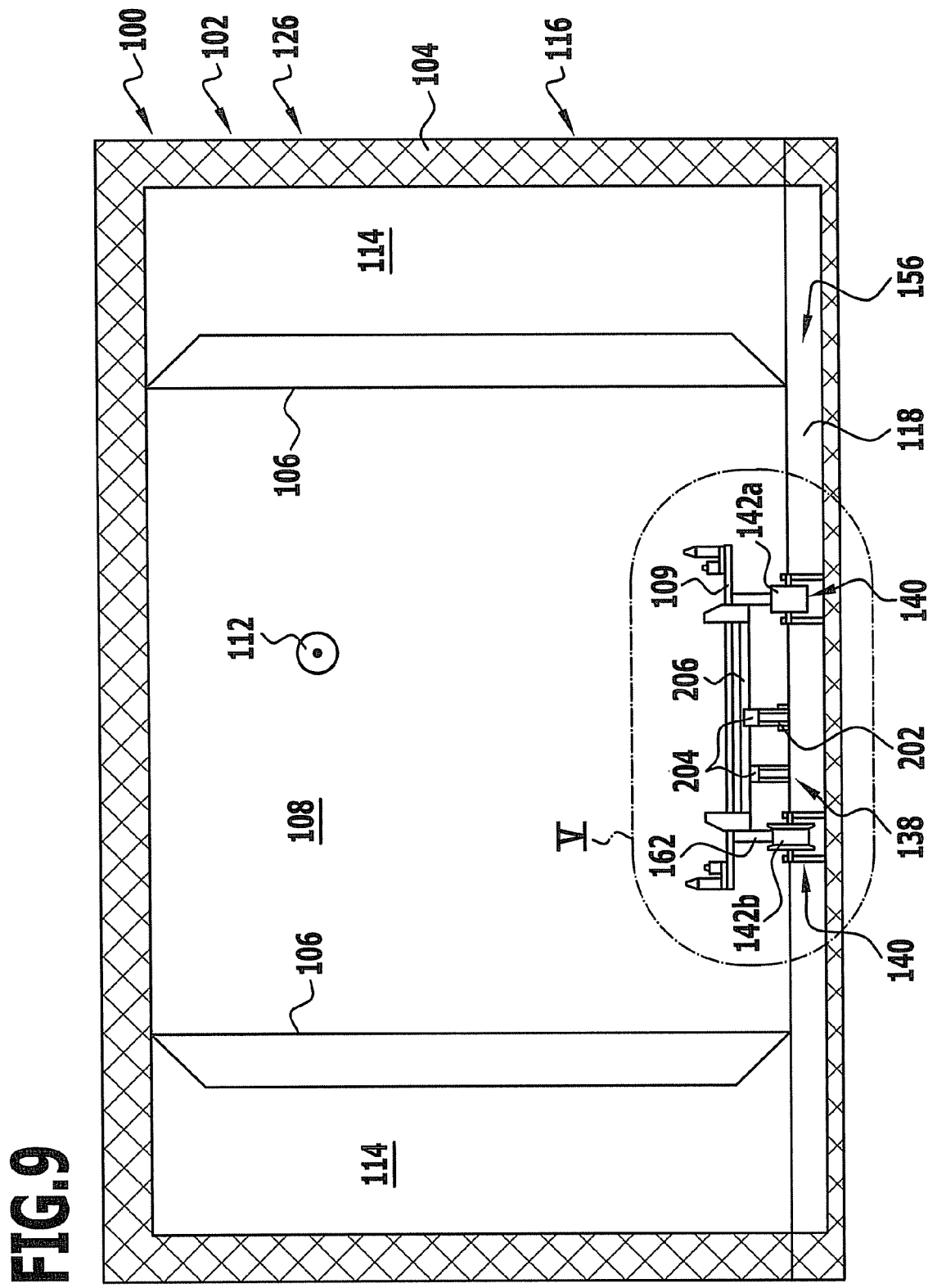
FIG. 9 a diagrammatic cross section through a third form of construction of a drier having a drier tunnel, through which vehicle bodies disposed on skid frames are conveyed, and having a conveying device comprising non-driven carrying rollers and a chain, which acts by means of drivers upon the skid frames.
Figure 10:
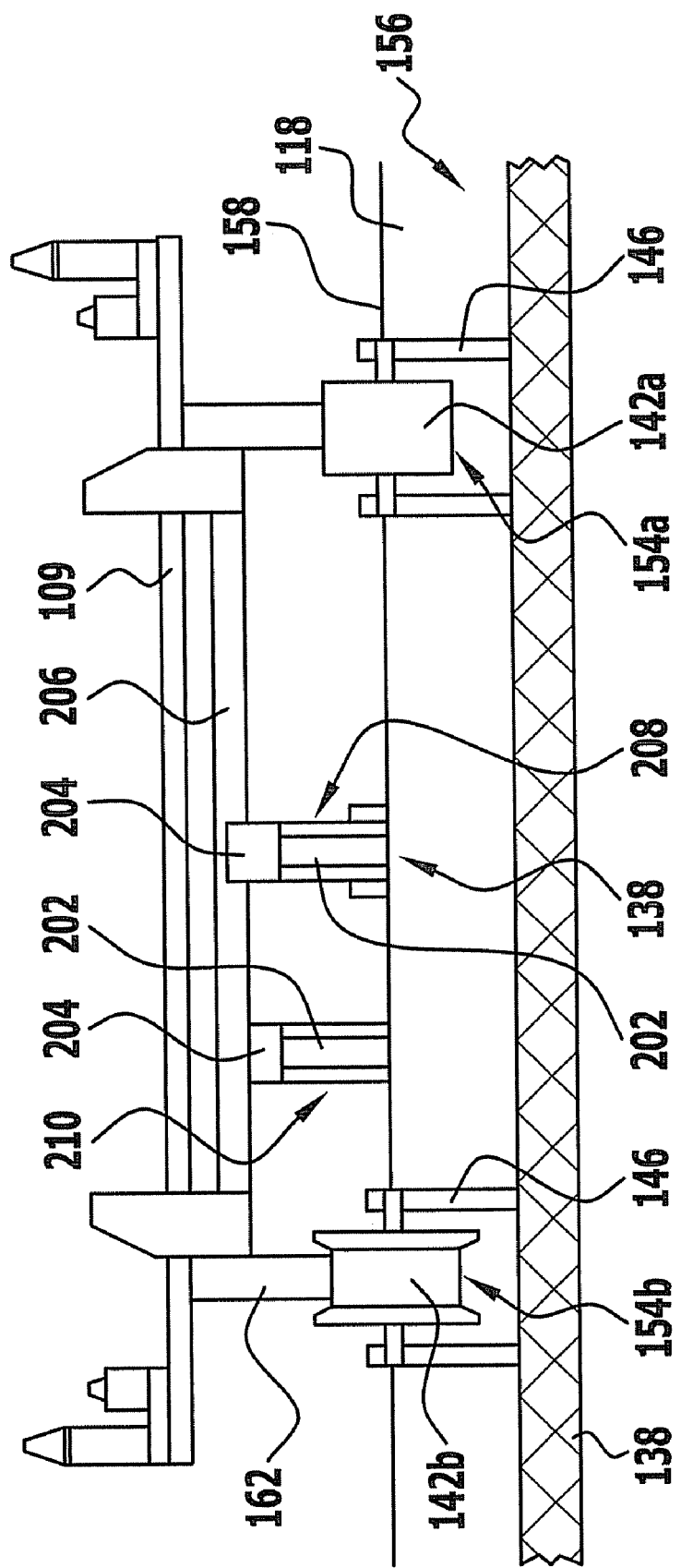
FIG. 10 an enlarged view of the region V of FIG. 9.

A third form of construction of a drier 100 that is represented in FIGS. 9 and 10 differs from the previously described forms of construction in that neither the lefthand carrying rollers 142a nor the righthand carrying rollers 142b are set in rotation, all of the carrying rollers 142 instead merely having the task of supporting the skid frames 109 with the vehicle bodies 110 disposed thereon and guiding them laterally in the course of a movement along the conveying direction 112.

Consequently, this form of construction dispenses entirely with the drive device 164 for setting the carrying rollers 142 in rotation.

Rather, the skid frames 109 with the vehicle bodies 110 disposed thereon are set in translational motion in conveying direction 112 by means of a traction means in the form of a chain 202, which revolves along the conveying direction 112 and has drivers 204, which are mutually spaced apart along the chain 202 and are pivotable between a coupled position, in which the driver 204 may act upon a cross-member 206 of in each case one skid frame 109 in order to pull the relevant skid frame 109 in the direction of motion of the chain, and an inoperative position, in which the driver 204 is laid flat in such a way that it runs through underneath the cross-members 206 of the skid frames 109 without touching them.

The chain 202 travels through a chain forward run 208, which extends approximately centrally between the carrying roller rows 154a and 154b along the conveying direction 112 and in which the chain, which is guided at guide rails (not shown), moves in conveying direction 112 and the drivers 204 of the chain 202 are in the coupled position, a tensioning and driving station (not shown) disposed in the exit region of the drier 100, a chain return run 210, which is disposed between the chain forward run 208 and the carrying roller row 154b and in which the chain moves counter to the conveying direction 112 and the drivers 204 of the chain 202 are in the inoperative position, and a deflection station (not shown), which is disposed in the entry region of the drier 100 and which in turn is adjoined by the chain forward run 208, so that the chain 202 closed in the form of a ring revolves continuously through the drier 100.

Otherwise, the third form of construction of a drier 100 represented in FIGS. 9 and 10 corresponds in construction, function and assembly method to the first form of construction represented in FIGS. 1 to 6, to the above description of which reference is made in this respect.

Figure 11:
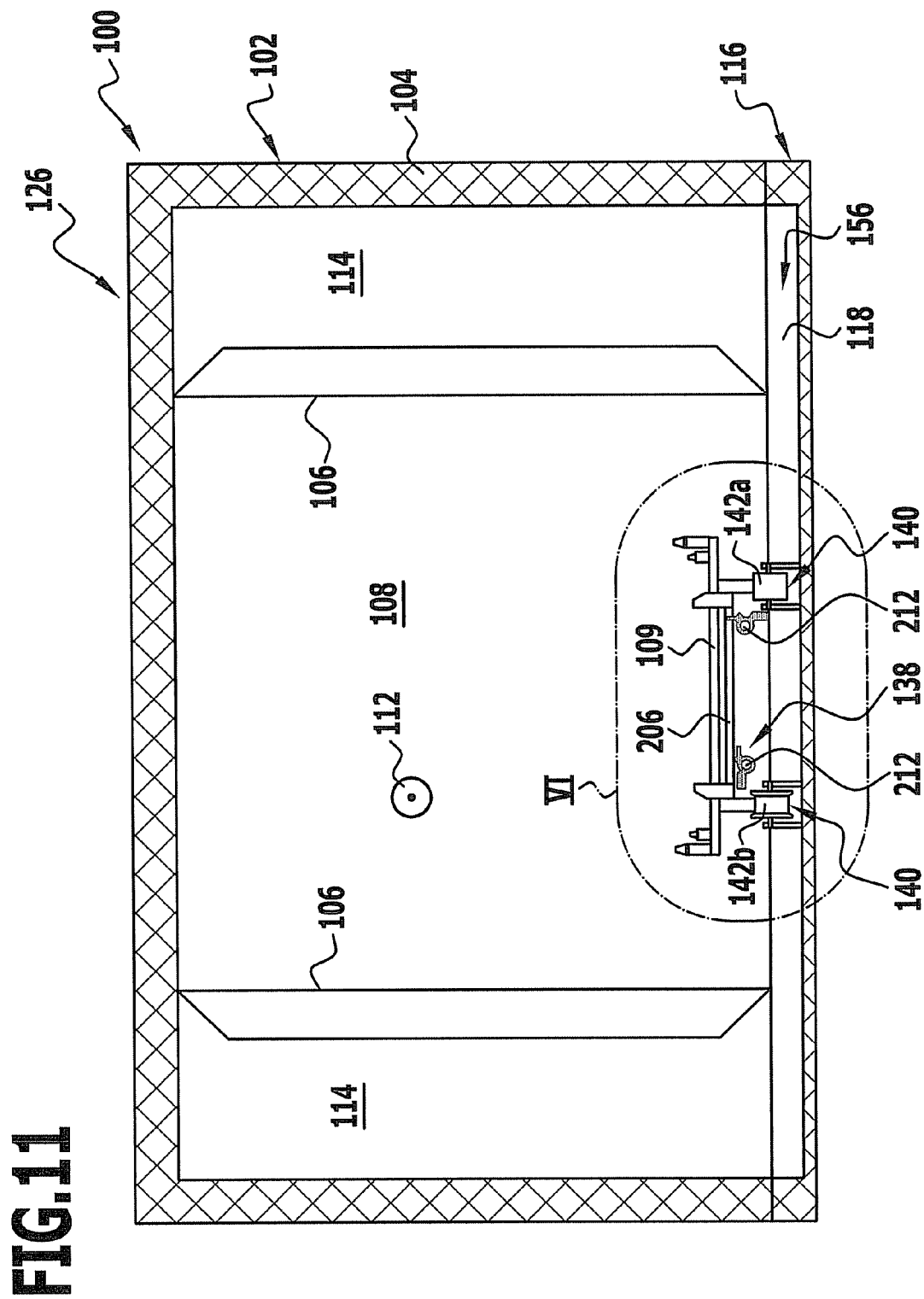
FIG. 11 a diagrammatic cross section through a fourth form of construction of a drier having a drier tunnel, through which vehicle bodies disposed on skid frames are conveyed, and having a conveying device comprising non-driven carrying rollers and a rope, which acts by means of drivers upon the skid frames.
Figure 12:
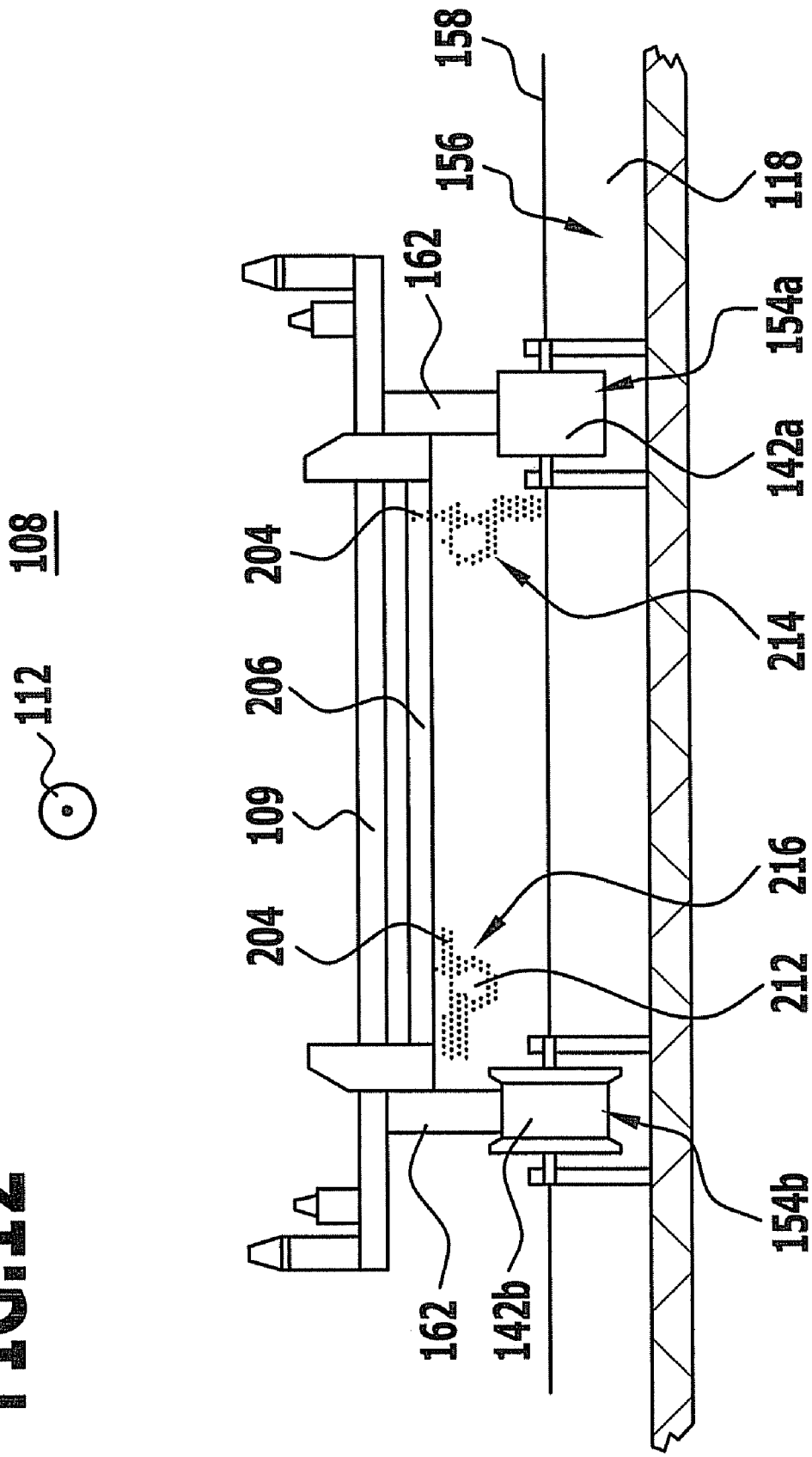
FIG. 12 an enlarged view of the region VI of FIG. 11.

A fourth form of construction of a drier 100 that is represented in FIGS. 11 and 12 differs from the third form of construction represented in FIGS. 9 and 10 in that, instead of a chain 202, as a traction means for setting the skid frames 109 with the vehicle bodies 110 disposed thereon in translational motion a rope 212 is used, in particular a steel rope, that has drivers 204 disposed at mutual intervals along the rope 212.

In this case too, the drivers 204 are pivotable from a coupled position, in which they hook into the cross-member 206 of a skid frame 109 and may therefore pull the skid frame 109 in conveying direction 112, and an inoperative position, in which the drivers 204 are laid flat in such a way that they run through underneath the cross-members 206 of the skid frames 109 without touching them.

In this form of construction, the rope 212 travels through a rope forward run 214, which extends between the carrying roller units 154a, 154b close to the lefthand carrying roller row 154a along the conveying direction 112 and in the region of which the drivers 204 are in the coupled position, a tensioning and driving station (not shown) disposed in an exit region of the drier 100, a rope return run 216, which extends between the carrying roller rows 154a, 154b close to the righthand carrying roller row 154b along the conveying direction 112 and in the region of which the drivers 204 are in the inoperative position, and a deflection station, which is disposed in an entry region of the drier 100 and adjoined by the rope forward run 214, so that the rope 212 closed in the form of a ring revolves continuously through the drier 100.

In this case, the drivers 204 situated in the rope forward run 214 and acting upon in each case one cross-member 206 of a skid frame 109 pull the skid frames 109 in conveying direction 112.

Otherwise, the fourth form of construction of a drier 100 represented in FIGS. 11 and 12 corresponds in construction, function and assembly method to the third form of construction represented in FIGS. 9 and 10, to the above description of which reference is made in this respect.

Figure 13:
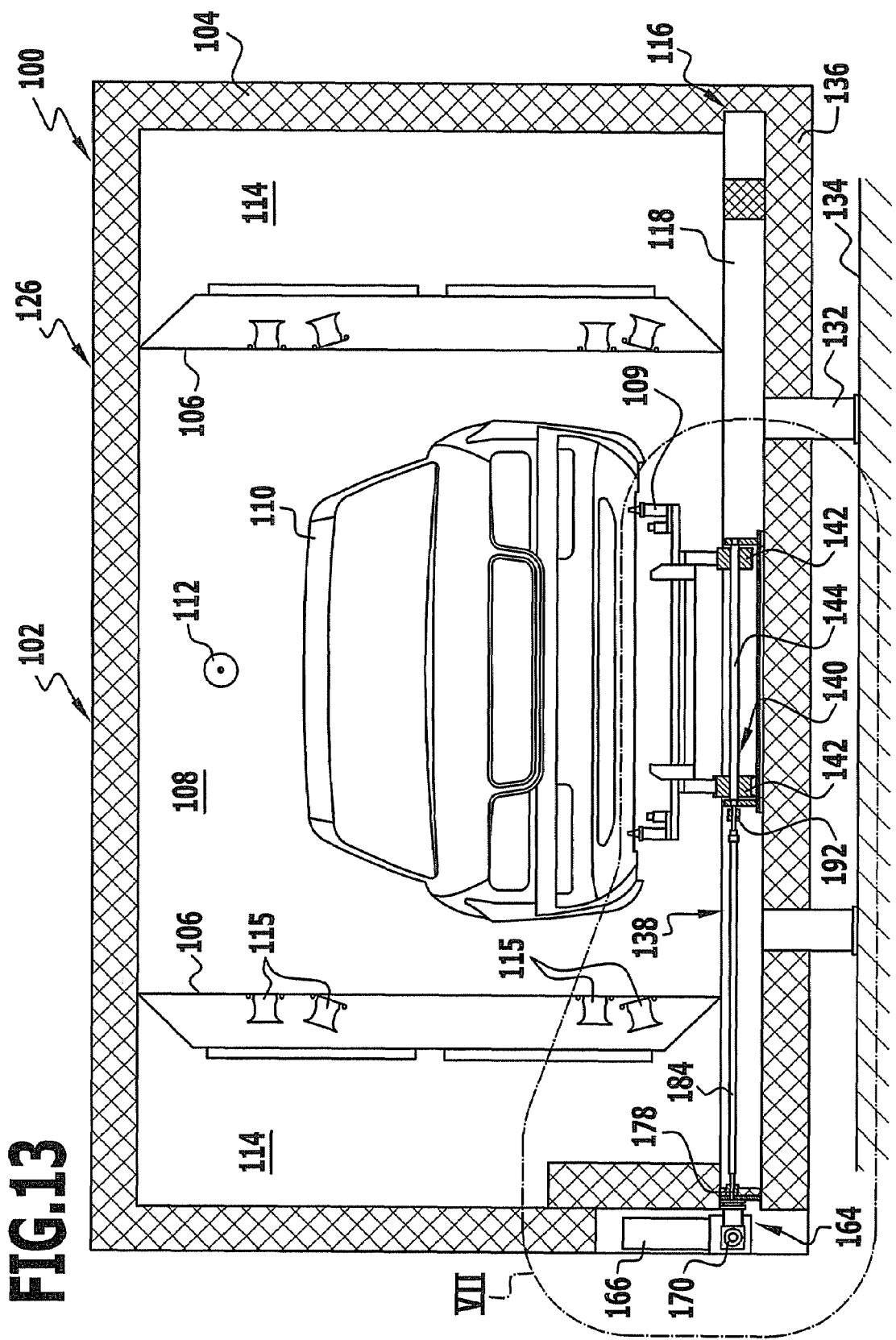
FIG. 13 a diagrammatic cross section through a fifth form of construction of a drier having a drier tunnel, through which vehicle bodies disposed on skid frames are conveyed, and having a conveying device comprising carrying roller units having in each case two carrying rollers disposed coaxially with one another, which are held on a common carrying roller shaft.
Figure 14:
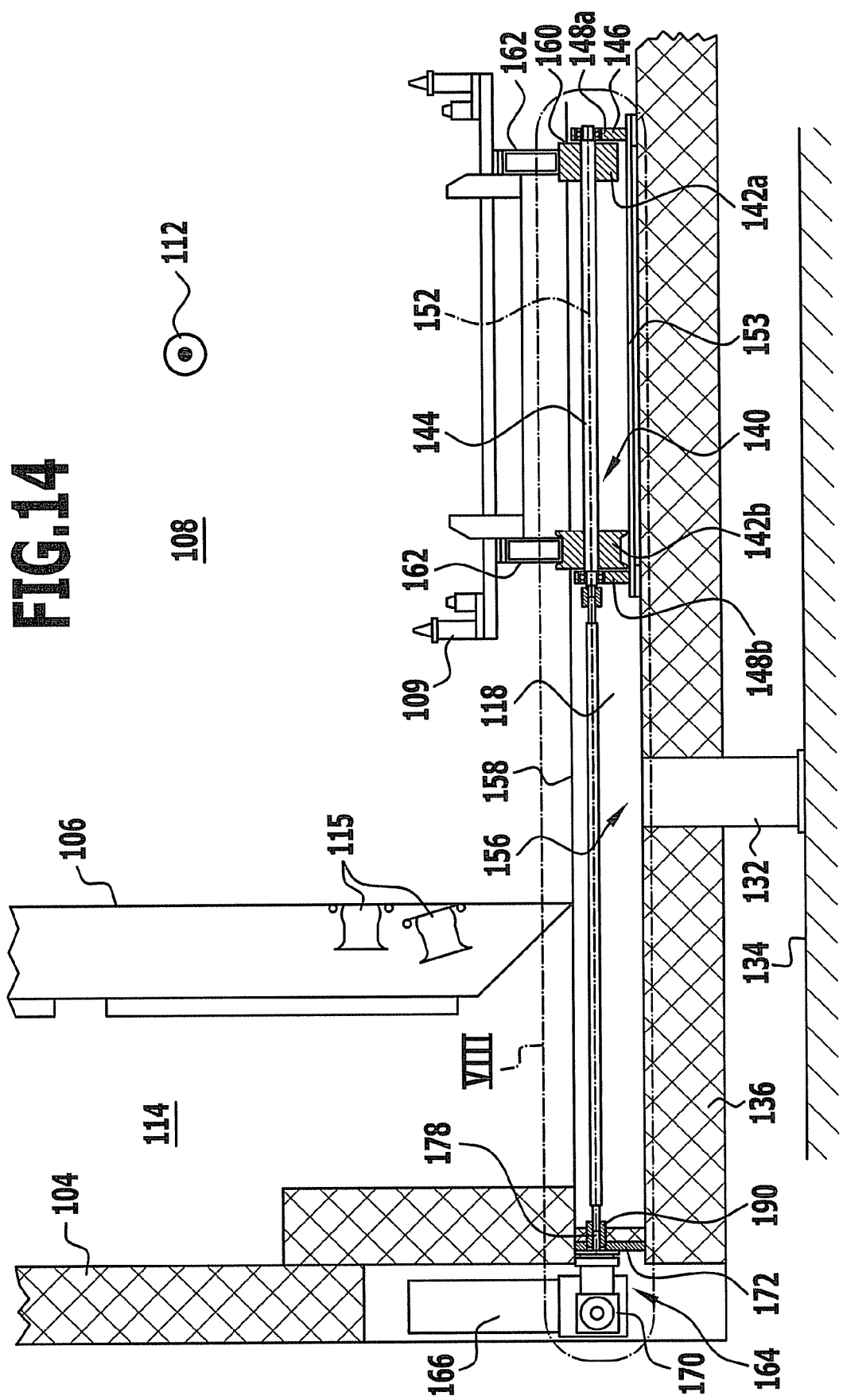
FIG. 14 an enlarged view of the region VII of FIG. 13.
Figure 15:
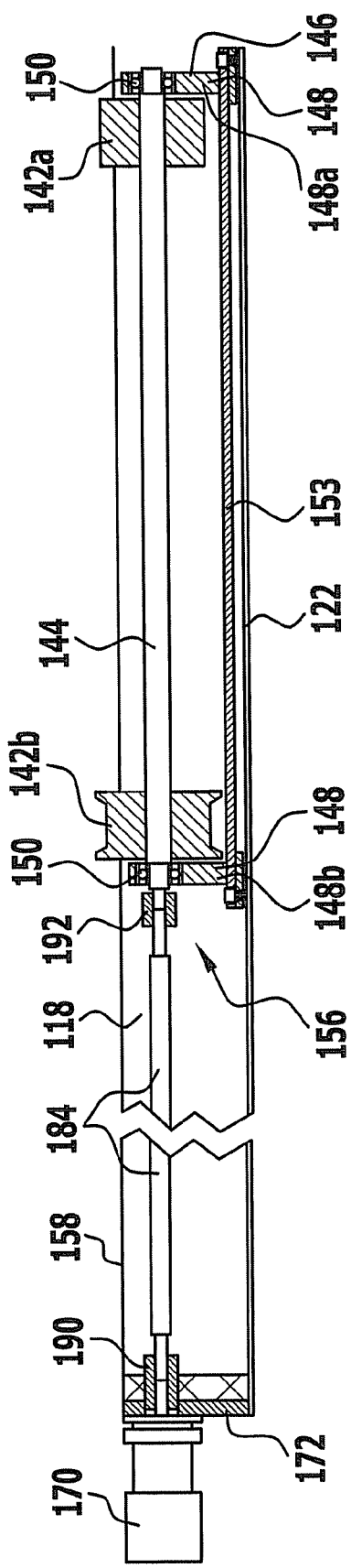
FIG. 15 an enlarged view of the region VIII of FIG. 14.

A fifth form of construction of a drier 100 that is represented in FIGS. 13 to 15 differs from the form of construction represented in FIGS. 1 to 6 in that each of the carrying roller units 140 disposed successively in conveying direction 112 comprises not just a single carrying roller 142a and/or 142b but both the (viewed in conveying direction 112) lefthand carrying roller 142a and the righthand carrying roller 142b of a carrying roller pair.

In this form of construction, both carrying rollers 142a, 142b are disposed in a rotationally fixed manner on a common carrying roller shaft 144, which is mounted on the two limbs 148 of a roller block 146 of the carrying roller unit 140 by means of ball bearings 150 rotatably about a horizontal axis of rotation 152 that extends at right angles to the conveying direction 112.

As FIGS. 13 to 15 reveal, in this case the (viewed in conveying direction 112) lefthand limb 148a of the roller block 146 is disposed on the left of the lefthand carrying roller 142a and the righthand limb 148b of the roller block 146 is disposed on the right of the righthand carrying roller 142b.

Both limbs 148a, 148b of the roller block 146 extend upwards from a common horizontal base plate 153, which extends in the longitudinal direction of the floor element 118 across the entire gap between the carrying rollers 142a, 142b.

This base plate is screw-fastened to the web 122 of the relevant floor element 118.

In this form of construction, therefore, in each case only one carrying roller unit 140 is fastened detachably to each of the floor elements 118.

The common carrying roller shaft 144 is connected by a, preferably flexible, coupling 192 in a rotationally fixed manner to the transverse connection shaft 184, via which the common carrying roller shaft 144 and hence both carrying rollers 142*a*, 142*b* are set in rotation by means of the drive device 164, as in the previously described first form of construction.

Since in the fifth form of construction represented in FIGS. 13 to 15 both carrying rollers that are associated with the same floor element 118 are seated on the same carrying roller shaft 144, this form of construction dispenses with the transverse connection shaft 198 of the first form of construction as well as the couplings 192 thereof.

Otherwise, the fifth form of construction of a drier 100 represented in FIGS. 13 to 15 corresponds in construction, function and assembly method to the first form of construction represented in FIGS. 1 to 6, to the above description of which reference is made in this respect.

The invention claimed is:

1. Drier for drying surface-treated workpieces, which are each disposed on a respective workpiece carrier,
   comprising a drier housing having a drier tunnel, through which the workpieces are moved along a conveying direction and which is delimited in a downward direction by a drier floor comprising a plurality of floor elements, and
   a conveying device that conveys the workpieces through the drier tunnel, wherein the conveying device comprises a plurality of carrying roller units, which are disposed successively in the conveying direction and each comprise at least one carrying roller, on which the workpiece carriers rest as they are conveyed through the drier tunnel, wherein the carrying roller units are integrated into the drier floor, are each mounted separately on a respective floor element of the drier floor and with the respective floor element form a preassembled unit,
   wherein each carrying roller unit is connected individually to only a single respective floor element of the drier floor.

2. Drier according to claim 1, wherein the carrying roller units each comprise only one carrying roller.

3. Drier according to claim 1, wherein the floor elements are load-bearing elements of the drier floor.

4. Drier according to claim 1, wherein the floor elements take the form of profile elements.

5. Drier according to claim 4, wherein the floor elements have a U-shaped or a hat-shaped cross section.

6. Drier according to claim 1, wherein fastened to the floor elements are feet, by which the drier is supported on a foundation.

7. Drier according to claim 1, wherein the floor elements each comprise a receiver, in which there is at least partially accommodated a carrying roller unit associated with the respective floor element.

8. Drier according to claim 1, wherein the floor elements extend transversely of the conveying direction.

9. Drier according to claim 8, wherein the floor elements extend substantially at right angles to the conveying direction.

10. Drier according to claim 1, wherein a plurality of floor elements, on each of which at least one carrying roller unit is mounted, are connected to one another by means of at least one stiffening element.

11. Drier according to claim 1, wherein the carrying roller units are mounted detachably on the respectively associated floor element.

12. Drier according to claim 1, wherein the floor elements are provided with a cover, which has in each case at least one through-opening for a carrying roller of a carrying roller unit.

13. Drier according to claim 12, wherein the cover is removable from the respectively associated floor element.

14. Drier according to claim 1, wherein the carrying roller units each comprise at least one carrying roller shaft that is mounted on a roller block so as to be detachable for maintenance purposes.

15. Drier according to claim 14, wherein the carrying roller shafts each comprise a shaft profile and a sleeve, which is detachably fastened to the shaft profile.

16. Drier according to claim 15, wherein the carrying roller shafts after detachment of the at least one sleeve are removable from the respectively associated roller block.

17. Drier according to claim 15, wherein the sleeve is screw-fastened to the shaft profile.

18. Drier according to claim 1, wherein the conveying device comprises a drive device for setting at least one carrying roller of a carrying roller unit in rotation.

19. Drier according to claim 18, wherein the drive device comprises a drive motor.

20. Drier according to claim 19, wherein the drive motor is disposed outside of the drier housing.

21. Drier according to claim 19, wherein for each driven carrying roller in each case a separate drive motor is provided.

22. Drier according to claim 19, wherein a plurality of driven carrying rollers are driven by means of the same drive motor.

23. Drier according to claim 19, wherein the drive motor has a plurality of driven shafts.

24. Drier according to claim 19, wherein the drive device comprises at least one connection shaft.

25. Drier according to claim 24, wherein at least one of the connection shafts is orientated transversely of the conveying direction.

26. Drier according to claim 25, wherein at least one of the connection shafts is oriented substantially at right angles to the conveying direction.

27. Drier according to claim 24, wherein at least one of the connection shafts is aligned substantially parallel to the conveying direction.

28. Drier according to claim 24, wherein at least one of the connection shafts is disposed outside of the drier housing.

29. Drier according to claim 24, wherein at least one of the connection shafts is disposed between two carrying rollers.

30. Drier according to claim 24, wherein at least one of the connection shafts is connected by at least one flexible coupling to a carrying roller or to a drive motor or to a gear unit.

31. Drier according to claim 18, wherein the drive device comprises at least one gear unit.

32. Drier according to claim 31, wherein the gear unit is disposed on a wall element of the drier housing.

33. Drier according to claim 32, wherein the wall element is connected in a substantially gastight manner to one of the floor elements of the drier floor.

34. Drier according to claim 33, wherein the wall element is welded in a substantially gastight manner to one of the floor elements of the drier floor.

35. Drier according to claim 32, wherein the wall element is provided with heat insulation.

36. Drier according to claim 31, wherein the gear unit takes the form of an angular gear unit.

37. Drier according to claim 18, wherein the drive device has at least one shaft seal for effecting the substantially gastight sealing of a shaft that extends through a wall element of the drier housing.

38. Drier according to claim 1, wherein the conveying speed of the workpieces along the conveying direction is variable.

39. Drier according to claim 38, wherein the conveying speed of the workpieces in the drier tunnel increases along the conveying direction.

40. Drier according to claim 1, wherein the drier comprises a plurality of sections disposed successively in the conveying direction, wherein the conveying speed of the workpieces along the conveying direction varies from section to section.

41. Drier according to claim 1, wherein the drier in its entry region and/or in its exit region is provided with a rapid-removal roller conveyor.

42. Drier according to claim 1, wherein the surface-treated workpieces are vehicle bodies.

43. Drier for drying surface-treated workpieces, which are each disposed on a respective workpiece carrier, comprising a drier housing having a drier tunnel, through which the workpieces are moved along a conveying direction and which is delimited in a downward direction by a drier floor comprising a plurality of floor elements, and a conveying device that conveys the workpieces through the drier tunnel, wherein the conveying device comprises a plurality of carrying roller units, which are disposed successively in the conveying direction and each comprise at least one carrying roller, on which the workpiece carriers rest as they are conveyed through the drier tunnel, wherein the carrying roller units are integrated into the drier floor, are each mounted separately on a respective floor element of the drier floor and with the respective floor element form a preassembled unit, wherein the floor elements each comprise a receiver, in which there is at least partially accommodated a carrying roller unit associated with the respective floor element.

* * * * *